United States Patent
Stavrou

(10) Patent No.: US 11,948,406 B2
(45) Date of Patent: Apr. 2, 2024

(54) NAUTICAL DEVICE DIAGNOSIS APPARATUS, REMOTE NAUTICAL DEVICE SURVEILLANCE SYSTEM, NAUTICAL DEVICE DIAGNOSIS METHOD, AND NAUTICAL DEVICE DIAGNOSIS COMPUTER-READABLE MEDIA

(71) Applicant: Furuno Hellas S.A., Glyfada (GR)

(72) Inventor: Nikolaos Stavrou, Athens (GR)

( * ) Notice: Subject to any disclaimer, the term of this patent is extended or adjusted under 35 U.S.C. 154(b) by 45 days.

(21) Appl. No.: 17/452,720

(22) Filed: Oct. 28, 2021

(65) Prior Publication Data

US 2022/0130182 A1    Apr. 28, 2022

(30) Foreign Application Priority Data

Oct. 28, 2020 (EP) .................................... 20204451

(51) Int. Cl.
*G07C 5/00*      (2006.01)
*B63B 79/30*     (2020.01)

(52) U.S. Cl.
CPC .............. *G07C 5/008* (2013.01); *B63B 79/30* (2020.01)

(58) Field of Classification Search
CPC ................................ G07C 5/008; B63B 79/30
USPC ....................................................... 701/31.5
See application file for complete search history.

(56) References Cited

U.S. PATENT DOCUMENTS

| | | | |
|---|---|---|---|
| 7,656,286 B2 * | 2/2010 | Benson | .................. G06Q 50/30 340/508 |
| 7,890,483 B1 | 2/2011 | Aaron et al. | |
| 8,452,475 B1 * | 5/2013 | West | ...................... G07C 5/006 701/31.6 |

(Continued)

FOREIGN PATENT DOCUMENTS

| | | |
|---|---|---|
| EP | 4283966 A2 | 11/2023 |
| KR | 20140110358 A | 1/2014 |
| KR | 102044868 B1 | 11/2019 |

OTHER PUBLICATIONS

European Patent Office, Extended European Search Report Issued in European Application No. 20204451.7, dated Apr. 30, 2021, Germany, 12 pages.

(Continued)

*Primary Examiner* — Logan M Kraft
*Assistant Examiner* — John D Bailey
(74) *Attorney, Agent, or Firm* — Alleman Hall Creasman & Tuttle LLP

(57) ABSTRACT

A diagnostic apparatus for diagnosing at least one nautical electronic device on a vessel, from a remote diagnostic center, is provided. The diagnostic apparatus is configured to: receive at least one message from the at least one nautical electronic device, including identification data for identifying the at least one nautical electronic device and alarm state data indicating a current alarm state of the at least one nautical electronic device; compare the current alarm state of the at least one nautical electronic device with a previous alarm state of the at least one nautical electronic (Continued)

device to detect a failure of the at least one nautical electronic device; and transmit failure detection information to a remote diagnostic center, the failure detection information comprising information associated with the failure of the at least one nautical electronic device and the identification data of the at least one nautical electronic device.

17 Claims, 29 Drawing Sheets

(56) References Cited

U.S. PATENT DOCUMENTS

| | | | | |
|---|---|---|---|---|
| 8,830,053 | B2* | 9/2014 | Benson | G08B 25/14 340/521 |
| 9,697,503 | B1* | 7/2017 | Penilla | G06Q 20/18 |
| 9,725,886 | B2* | 8/2017 | Sugiura | E02F 9/268 |
| 9,734,528 | B2* | 8/2017 | Gormley | G06Q 30/0621 |
| 10,206,079 | B1* | 2/2019 | Fritz | H04L 51/224 |
| 10,529,149 | B1* | 1/2020 | Manoukis | G07C 5/0808 |
| 2002/0103582 | A1* | 8/2002 | Ohmura | G07C 5/008 701/31.4 |
| 2005/0182536 | A1* | 8/2005 | Doyle | G01R 31/3647 340/455 |
| 2007/0008410 | A1* | 1/2007 | Benson | G08B 21/02 348/142 |
| 2007/0027583 | A1* | 2/2007 | Tamir | H01L 23/49838 701/1 |
| 2008/0183427 | A1* | 7/2008 | Miller | G05B 23/024 702/179 |
| 2011/0130906 | A1* | 6/2011 | Mayer | G07C 5/085 903/903 |
| 2011/0130916 | A1* | 6/2011 | Mayer | B60L 3/12 903/903 |
| 2013/0002455 | A1* | 1/2013 | Koehrsen | G08G 1/20 340/989 |
| 2013/0145482 | A1* | 6/2013 | Ricci | G01C 21/20 726/28 |
| 2013/0204466 | A1* | 8/2013 | Ricci | G06F 11/2038 701/2 |
| 2013/0204484 | A1* | 8/2013 | Ricci | G06F 3/0484 701/29.6 |
| 2013/0204493 | A1* | 8/2013 | Ricci | G06F 11/3055 701/1 |
| 2013/0204943 | A1* | 8/2013 | Ricci | G08G 1/096791 709/204 |
| 2013/0227648 | A1* | 8/2013 | Ricci | H04W 12/088 726/3 |
| 2013/0282238 | A1* | 10/2013 | Ricci | G06F 17/00 701/99 |
| 2014/0143839 | A1* | 5/2014 | Ricci | H04N 21/814 726/4 |
| 2014/0324278 | A1* | 10/2014 | Teng | G06Q 50/30 701/31.5 |
| 2016/0026659 | A1* | 1/2016 | Harley | H04W 4/44 707/758 |
| 2016/0043914 | A1* | 2/2016 | Taranath | H04L 41/0604 709/224 |
| 2016/0247333 | A1* | 8/2016 | Rockwell | G07C 5/0816 |
| 2017/0264527 | A1* | 9/2017 | Jain | H04L 41/0654 |
| 2017/0270490 | A1* | 9/2017 | Penilla | G07C 5/006 |
| 2017/0302452 | A1* | 10/2017 | Nanjundappa | B60R 16/023 |
| 2018/0289999 | A1* | 10/2018 | Kay | G07C 5/0816 |
| 2018/0293818 | A1* | 10/2018 | Linsmeier | G06Q 50/28 |
| 2018/0324150 | A1* | 11/2018 | Al-Khabbaz | H04L 63/0236 |
| 2019/0262646 | A1* | 8/2019 | Linsmeier | F04D 29/167 |
| 2019/0356552 | A1* | 11/2019 | Ricci | G06F 11/2023 |
| 2020/0096597 | A1* | 3/2020 | Kobayashi | H04W 4/40 |
| 2020/0128041 | A1* | 4/2020 | Rambo | H04L 12/40006 |
| 2020/0234513 | A1* | 7/2020 | Aljanabi | G07C 5/0808 |
| 2020/0334926 | A1* | 10/2020 | Tsurumi | H04W 12/121 |
| 2021/0006510 | A1* | 1/2021 | Cho | H04L 43/0876 |
| 2022/0051491 | A1* | 2/2022 | Higuchi | G08G 1/161 |

OTHER PUBLICATIONS

European Patent Office, Office action issued in European Application No. 20204451.7, dated Feb. 16, 2023, Netherlands, 9 pages.
European Patent Office, Extended European Search Report Issued in Application No. 23201168.4, dated Jan. 22, 2024, Germany, 9 pages.
European Patent Office, Office Action Issued in Application No. 20204451.7, dated Jan. 12, 2024, Netherlands, 8 pages.

* cited by examiner

| Event | Local Variables | Static Variables | Settings | Details |

Trigger Event Type: NMEA 1803 Event ⌄

Interface: 172.31:16.27  — 1001

Message Type: ALR — 1003

UDP Transmission: Multicast — 1005

Group Address: 239.192.0.4 — 1007

Port: 60004 — 1009

FIG. 10

| Field No. | Name of the field | Description |
|---|---|---|
| 1 | Device | This field comprises name of the one or more electronic devices (for example, EI0001 ECDIS No.1) |
| 2 | Alarm number | This field comprises unique number specific for each alarm. |
| 3 | Alarm acknowledgment state (Alarm ACK state) | This field comprises a single-letter value that indicates whether the alarm is acknowledged or not by the user |
| 5 | Last alarm condition | This field comprises information whether the alarm condition was taken during the last request. |
| 6 | Timestamp | This field comprises a timestamp of the occurred alarm event handled by the diagnostic apparatus. |
| 7 | Last changed timestamp | This field comprises a timestamp associated with last event alarm state change occurred |
| 8 | Log | This field comprises a three-letter value that indicates the message type (i.e., ALR). |
| 9 | Description | This field comprises the description of the alarm |
| 10 | Equipment name | This field comprises a two-letter word that defines the equipment type (for example, RA RADAR) |
| 11 | Source IP | This field comprises IP address of the one or more electronic devices |

FIG. 13

| Field No. | Name of the field | Description |
|---|---|---|
| 1 | Equipment | This field comprises a two-letter word that defines the equipment type (for example, RA RADAR) |
| 2 | Alarm number | This field comprises unique number specific for each alarm. |
| 3 | Alarm key | This field comprises a word that describes an alarm key, and each alarm key is unique for each alarm (for example, fun_fcr2xx9_main_monitor_lcd_unit_lifetime_over). |

FIG. 14

| Field No. | Name of the field | Description |
|---|---|---|
| 1 | Last request | This field comprises a timestamp of the last time the schedule request for alarm states was run. |

FIG. 15

| Name | Storage | Columns |
|---|---|---|
| Alarm_key_device | Disk | equipment (TEXT(128)), alarm_number (NUMERIC), alarm_key (TEXT(100)), device_model (TEXT(128)), risk (TEXT(1) |
| DeviceDPTstate | Disk | Device_source (TEXT(32), NOT NULL), Timestamp (TEXT(32), DEFAULT'0'), Water_Depth (REAL), Source_ip (TEXT(1 |
| DeviceDPSstate | Disk | Device_source (TEXT(32), NOT NULL), Equipment_name (TEXT(10), NOT NULL), Source_ip (TEXT(16)), Latitude (TEX |
| DeviceHDTstate | Disk | Device_source (TEXT(32)), Equipment_name (TEXT(32)), Source_ip (TEXT(32)), Timestamp (TIMESTAMP), Log (TEXT |
| DeviceMWVstate | Disk | Device_source (TEXT(32)), Equipment_name (TEXT(32)), Source_ip (TEXT(32)), Timestamp (TIMESTAMP), Log (TEXT |
| DeviceROTstate | Disk | Device_source (TEXT(32)), Equipment_name (TEXT(32)), Source_ip (TEXT(32)), Timestamp (TIMESTAMP), Log (TEXT |
| DevicesAlarmStatesRequest | Disk | Last_Published_Time (TIMESTAMP), Publish_Interval (INTEGER) |
| DevicesPropertyStatesRequest | Disk | Last_Published_Time (TIMESTAMP), Publish_Interval (INTEGER) |
| Devices_Alarm_States | Disk | Device (TEXT(32), NOT NULL), alarm_number (NUMERIC, NOT NULL), alarm_condition (TEXT(1), NOT NULL), Ala |
| DeviceVBWstate | Disk | Device_source (TEXT(32)), Equipment_name (TEXT(32)), Source_ip (TEXT(32)), Timestamp (TIMESTAMP), Log (TIMEST |
| DeviceVLWstate | Disk | Device_source (TEXT(32)), Equipment_name (TEXT(32)), Source_ip (TEXT(32)), Log (TEXT(32)), Timestamp (TIMEST |
| DeviceVTGstate | Disk | Device_source (TEXT(32)), Equipment_name (TEXT(32)), Source_ip (TEXT(32)), Log (TEXT(32)), Timestamp (TIMEST |
| Propery_key | Disk | equipment (TEXT(128)), property_key (TEXT(100)) |

| Device | alarm_number | alarm_condition | Alarm_ack_state | Last_Alarm_Condition | Timestamp | Last_Changed_Timesta... | Log | Description |
|---|---|---|---|---|---|---|---|---|
| EI0001 | 278 | A | A | | 2020-02-26 22:52:46.182 | 1990-01-01 00:00:00.000 | ALR | STW Not Availabl |
| EI0001 | 30 | A | V | | 2020-02-26 22:52:46.179 | 1990-01-01 00:00:00.000 | ALR | Sensor Adapter 1 |
| EI0001 | 277 | A | A | | 2020-02-26 22:52:46.181 | 1990-01-01 00:00:00.000 | ALR | Wind Speed/Direc |
| EI0001 | 380 | V | A | A | 2020-02-27 11:37:01.974 | 202-02-27 11:36:58.000 | ALR | AIS COM error |
| EI0001 | 27 | A | A | | 2020-02-26 22:52:46.178 | 1990-01-01 00:00:00.000 | ALR | Main Monitor CO |
| EI0001 | 33 | A | V | | 2020-02-26 22:52:46.180 | 1990-01-01 00:00:00.000 | ALR | Sensor Adapter 4 |
| EI0001 | 279 | A | A | | 2020-02-26 22:52:46.183 | 1990-01-01 00:00:00.000 | ALR | COG/SOG Not Av |
| EI0001 | 284 | A | A | | 2020-02-26 22:52:46.184 | 1990-01-01 00:00:00.000 | ALR | SOG Not Availabl |
| EI0001 | 280 | A | A | | 2020-02-26 22:52:46.184 | 1990-01-01 00:00:00.000 | ALR | SDMF 1 COM Err |

FIG. 20

| Current State | Previous (Last) State | Timestamp (min) | Publish Condition | Alarm Condition |
|---|---|---|---|---|
| \multicolumn{5}{l}{When alarm event occurred between the previous request time stamp and current scheduled request time stamp} | | | | |
| 1 | 0 | 0-5 | 1 | Set the last alarm condition =1 |
| 0 | 1 | 5-7 | Waiting for next schedule | |
| 1 | 0 | 7-10 | 1 | Set the last alarm condition =1 |
| 1 | 1 | 10-15 | 0 | |
| 0 | 1 | 15-20 | 0 | Set the last alarm condition =0 |

HermAce / Local Dtabase

Tables | Management | Execute SQL

| Name | Storage | Columns | | | | | |
|---|---|---|---|---|---|---|---|
| Row Number | Device | alarm_number | alarm_condition | alarm_ack_state | Last_Alarm_Condition | Timestamp | Last_Changed_Timesta... | Log | De |
| 5 | EI0001 | 30 | A | V | | 2020-02-26 22:52:46.179 | 1990-01-01 00:00:00.000 | ALR | Sen |
| 6 | EI0001 | 277 | A | A | | 2020-02-26 22:52:46.181 | 1990-01-01 00:00:00.000 | ALR | Win |
| 7 | EI0001 | 380 | V | A | A | 2020-02-27 11:37:01.974 | 202-02-27 11:36:58.000 | ALR | AIS |
| 8 | EI0001 | 27 | A | A | | 2020-02-26 22:52:46.178 | 1990-01-01 00:00:00.000 | ALR | Main |
| 9 | EI0001 | 33 | A | V | | 2020-02-26 22:52:46.180 | 1990-01-01 00:00:00.000 | ALR | Sen |
| 10 | EI0001 | 279 | A | A | | 2020-02-26 22:52:46.183 | 1990-01-01 00:00:00.000 | ALR | CO |
| 11 | EI0001 | 284 | A | A | | 2020-02-26 22:52:46.184 | 1990-01-01 00:00:00.000 | ALR | SO |
| 12 | EI0001 | 280 | A | A | | 2020-02-26 22:52:46.184 | 1990-01-01 00:00:00.000 | ALR | SDM |
| 13 | EI0001 | 311 | A | V | | 2020-02-26 22:52:46.185 | 1990-01-01 00:00:00.000 | ALR | Oth |
| 14 | EI0001 | 360 | A | A | | 2020-02-26 22:52:46.186 | 1990-01-01 00:00:00.000 | ALR | Win |
| 15 | EI0001 | 312 | A | A | | 2020-02-26 22:52:46.186 | 1990-01-01 00:00:00.000 | ALR | Oth |
| 16 | EI0001 | 170 | A | A | | 2020-02-26 22:52:46.180 | 1990-01-01 00:00:00.000 | ALR | Posi |
| 17 | EI0001 | 28 | A | A | | 2020-02-26 22:52:46.179 | 1990-01-01 00:00:00.000 | ALR | Sub |
| 18 | EI0001 | 450 | A | A | | 2020-02-26 22:52:46.187 | 1990-01-01 00:00:00.000 | ALR | Hea |
| 19 | EI0001 | 290 | A | A | | 2020-02-26 22:52:46.184 | 1990-01-01 00:00:00.000 | ALR | EPF |
| 20 | EI0001 | 390 | A | A | | 2020-02-26 22:52:46.187 | 1990-01-01 00:00:00.000 | ALR | NA |
| 21 | EI0001 | 453 | A | A | | 2020-02-26 22:52:46.187 | 1990-01-01 00:00:00.000 | ALR | SD |
| 22 | EI0001 | 291 | A | A | | 2020-02-26 22:52:46.185 | 1990-01-01 00:00:00.000 | ALR | EPF |
| 23 | EI0001 | 255 | A | A | | 2020-02-26 22:52:46.181 | 1990-01-01 00:00:00.000 | ALR | Gyn |
| 24 | EI0001 | 636 | A | V | | 2020-02-26 22:52:46.188 | 1990-01-01 00:00:00.000 | ALR | No |
| 25 | GP0001 | 210 | A | A | | 2020-02-26 22:52:48.193 | 1990-01-01 00:00:00.000 | ALR | HD |
| 26 | GP0001 | 212 | A | A | | 2020-02-26 22:52:50.180 | 1990-01-01 00:00:00.000 | ALR | Loss |

FIG. 23

| Name | No. | Description |
|---|---|---|
| Get status | 6 | Returns the status of the device in a JSON format |
| Log List | 7 | Returns the name of a tar.gz file. |
| Data Downloading | 10 | Performs "Log List" command and stores a ".tar.gz" file that contains the LOGS of the one or more devices |
| Export Settings | 2 | Stores a. "tar.gz" file that contains the settings of the one or more device |

FIG. 26

NAUTICAL DEVICE DIAGNOSIS APPARATUS, REMOTE NAUTICAL DEVICE SURVEILLANCE SYSTEM, NAUTICAL DEVICE DIAGNOSIS METHOD, AND NAUTICAL DEVICE DIAGNOSIS COMPUTER-READABLE MEDIA

CROSS-REFERENCE TO RELATED APPLICATION(S)

This application claims priority under 35 U.S.C. § 119 to European Patent Application No. EP20204451, which was filed on Oct. 28, 2020, the entire disclosure of which is hereby incorporated herein by reference.

TECHNICAL FIELD

An example embodiment of the present disclosure generally relates to remote monitoring, and more particularly relates to an apparatus and a method for determining equipment failure at a vessel and providing troubleshooting instructions from a diagnostic centre remotely located at land.

BACKGROUND

Shipping company's crews are specialized to ensure integrity, safety, and availability of vessels. The vessel comprises number of electronic equipment which ensures safety and efficient working of the vessel. When an abnormality occurs in any electronic equipment (hereinafter electronic equipment and devices are used interchangeably) mounted on the vessel, the crew informs the situation of the devices to the shipping company. The shipping company may then provide the obtained information to a diagnostic centre, in order to obtain instructions for troubleshooting the device failure. The instructions are then forwarded by the diagnostic centre to the vessel. However, the communication between the shipping company and the vessel varies depending upon the situation and it is often complex. Oftentimes, due to high workload on the crew on-board the vessel, the failure of the devices may remain unreported or at times wrong error description is sent to the diagnostic centre, which in many cases has resulted into sudden breakdown at the vessel. It is also well known that often, if there is a problem with a device on the vessel, and because the crew does not want to be blamed that they broke the device, they do not want to inform that the device was out of order until the time of a port call.

Therefore, the information obtained from the vessel may lack essential details associated with device failure. Due to the lack of complete information associated with the device failure, diagnosing the exact cause of the device failure, and providing corresponding guidance for troubleshooting the device failure is difficult. Further, currently satellite communication links are used to provide real-time information associated with devices on board the vessel to the remote diagnostic centres for remote monitoring of the devices. However, generally data received by remote diagnostic centres may contain large volume of information, which may not all be relevant. Further, to process such large volume requires expensive infrastructure, as well as sophisticated processing capabilities to sift through all the data and identify data relevant failure of the devices and provide troubleshooting instructions, Accordingly, there is a need for a cost-effective system and/or architecture that provides a direct bi-directional communication between the vessel and the diagnostic centre in order to troubleshoot the failure of the device effectively and in time.

SUMMARY

In order to solve the foregoing problem, the present disclosure provides a diagnostic apparatus located on a vessel, for monitoring of one or more nautical electronic devices, all located on the same vessel as the diagnostic apparatus, from a remote diagnostic centre. The diagnostic apparatus includes memory configured to store instructions; and processing circuitry configured to execute the stored instructions to receive at least one message from the at least one nautical electronic device, including a combination of two distinct categories of data, where the first category is called identification data that consists of information about the at least one message and identification of the nautical electronic device sending the at least one message (for example, transmission method of the at least one message, name of the at least one nautical electronic device). The second category is called specification data that consists of information about the state of the nautical electronic device, in terms of nautical electronic device's malfunctions or failures (alarms) or in terms of nautical electronic device's measurements or readings (properties).

According to some example embodiment, the at least one message, comprising the identification data and the specification data (or the alarm state data), is based on National Marine Electronics Association (NMEA) 0183 message.

According to some example embodiment, the processing circuitry is further configured to: compare a message type of the at least one message with a target message type, wherein when the message type of the at least one message matches with the target message type, the at least one message is parsed; and when the message type of the at least one message does not match with the target message type, the at least one message is ignored.

According to some example embodiment, the message type comprises at least one of: a UNICAST message type, wherein the UNICAST message type is associated with a one-to-one transmission from a nautical electronic device to the diagnostic apparatus, and a MULTICAST message type, where the MULTICAST message type is associated with a group communication where data transmission is addressed to a group of destination nautical electronic devices simultaneously.

According to some example embodiment, the processing circuitry is further configured to identify the NMEA 0183 message encapsulated in each message of the one or more messages, based on the parsing. Further, the detecting module is configured to compare the NMEA 0183 message against a predefined set of valid NMEA 0183 message types. When the NMEA 0183 message belongs to the predefined set of valid NMEA 0183 message types, the processing circuitry is configured to continue parsing the NMEA 0183 message; and when the NMEA 0183 message does not belong to the predefined set of valid NMEA 0183 message types, the processing circuitry is configured to ignore the NMEA 0183 message.

According to some example embodiment, to detect the failure of the at least one nautical electronic device, the processing circuitry is further configured to: execute a first trigger process constantly as a background process to receive the at least one message from the at least one nautical electronic device, wherein the first trigger process is configured to compare the current alarm state of the at least one nautical electronic device to the previous alarm state of the at least one nautical electronic device using the alarm state data in the at least one message, and wherein the processing circuitry is further configured to: transmit the failure detection information associated with the at least one nautical electronic device to the remote diagnostic center based on the comparison performed by the first trigger process.

According to some example embodiment, to detect the failure of the at least one nautical electronic device, the processing circuitry is further configured to: execute a second trigger process at scheduled intervals to: compare, at each scheduled interval, the current alarm state of the at least one nautical electronic device with the previous alarm state of the at least one nautical electronic device using the alarm state data in the at least one message, and wherein the processing circuitry is further configured to: transmit the failure detection information associated with the at least one nautical electronic device to the remote diagnostic center based on the processing of the at least one message by the second trigger process According to some example embodiment, the processing circuitry is further configured to: store the current alarm state and the previous alarm state for the at least one nautical electronic device in a database; and update the current alarm state and the previous alarm state in the database, each time the at least one message associated with the at least one electronic device is received. According to some example embodiment, the processing circuitry is further configured to store a timestamp of change of alarm state and a timestamp of the last alarm state change in the database.

According to some example embodiment, the transmitting module is further configured to transmit information to the remote diagnostic center by using a satellite communication link.

Accordingly one embodiment discloses a system comprising: a remote diagnostic center located on land, and a diagnostic apparatus, on a vessel, configured to diagnose at least one nautical electronic device on the vessel, wherein the diagnostic apparatus is configured to: receive at least one message from the at least one nautical one nautical electronic device, including identification data for identifying the at least one nautical electronic device and alarm state data indicating a current alarm state of the at least one nautical electronic device; compare the current alarm state of the at least one nautical electronic device with a previous alarm state of the at least one nautical electronic device to detect a failure of the at least one nautical electronic device; transmit failure detection information to the remote diagnostic center, the failure detection information comprising information associated with the failure of the at least one nautical electronic device and the identification data of the at least one nautical electronic device; and receive, from the remote diagnostic center, troubleshooting instructions to troubleshoot the failure of the at least one nautical electronic device.

Accordingly one embodiment discloses a method comprising receiving at least one message from the at least one nautical one nautical electronic device, including identification data for identifying the at least one nautical electronic device and alarm state data indicating a current alarm state of the at least one nautical electronic device; comparing the current alarm state of the at least one nautical electronic device with a previous alarm state of the at least one nautical electronic device to detect a failure of the at least one nautical electronic device; transmitting failure detection information to a remote diagnostic center, the failure detection information comprising information associated with the failure of the at least one nautical electronic device and the identification data of the at least one nautical electronic device; and receiving, from the remote diagnostic center, troubleshooting instructions to troubleshoot the failure of the at least one nautical electronic device.

Accordingly another embodiment discloses a computer programmable product comprising a non-transitory computer readable medium having stored thereon computer executable instructions which when executed by one or more processors, cause the one or more processors to diagnose at least one nautical electronic device on a vessel, the instructions comprising: receiving at least one message from the at least one nautical one nautical electronic device, including identification data for identifying the at least one nautical electronic device and alarm state data indicating a current alarm state of the at least one nautical electronic device; comparing the current alarm state of the at least one nautical electronic device with a previous alarm state of the at least one nautical electronic device to detect a failure of the at least one nautical electronic device; transmitting failure detection information to a remote diagnostic centre, the failure detection information comprising information associated with the failure of the at least one nautical electronic device and the identification data of the at least one nautical electronic device; and receiving, from the remote diagnostic centre, troubleshooting instructions to troubleshoot the failure of the at least one nautical electronic device.

In accordance with various embodiments, the present disclosure proposes a hybrid architecture that uses the diagnostic apparatus for monitoring of the one or more nautical electronic devices that are in communication with the diagnostic apparatus. The diagnostic apparatus determines failure of the one or more nautical electronic devices based on parsing of the one or more messages received from the one or more nautical electronic devices. On determination of the failure of the one or more devices, the diagnostic apparatus provides information related to the failure of the corresponding devices (i.e., failure detection information) directly to the remote diagnostic centre using a first satellite communication link. In this way, only relevant information associated with the failure of the devices is provided to the remote diagnostic centre, which allows the remote diagnostic centre to diagnose the problem and provide troubleshooting instructions in lesser time. Further, device management (DM) and connectivity management (CM) services for a device WISE (DW) Gateway provided using a second satellite communication link. Thus, the first satellite communication link is used dedicatedly for remote monitoring and troubleshooting of failure of the devices provided using the diagnostic apparatus, which enables speedy monitoring and troubleshooting of the failure of the devices without any dependency on the DM/CM services.

The foregoing summary is illustrative only and is not intended to be in any way limiting. In addition to the illustrative aspects, embodiments, and features described above, further aspects, embodiments, and features will become apparent by reference to the drawings and the following detailed description.

According to the present disclosure, an apparatus, a system, a method, and a computer programmable product for remote monitoring and diagnosis of at least one nautical electronic device on a vessel is provided. The apparatus is used to remotely monitor and diagnose the at least one nautical electronic device on board the vessel. The apparatus directly communicates with the remote diagnostic centre to provide information regarding failure of the at least one nautical electronic device and further to obtain troubleshooting instructions to operate the failed at least one nautical electronic device, which allows efficient troubleshooting of the failed at least one nautical electronic device.

BRIEF DESCRIPTION OF THE DRAWINGS

The present disclosure is illustrated by way of example and not by way of limitation in the figures of the accompanying drawings, in which the like reference numerals indicate like elements and in which:

FIG. 10 is a schematic diagram that exemplarily illustrates initialization procedure of the diagnostic apparatus, in accordance with an example embodiment;

FIG. 13 is a tabular representation of the Device Alarms States, in accordance with an example embodiment;

FIG. 14 is a tabular representation of the Alarm Keys, in accordance with an example embodiment;

FIG. 15 is a tabular representation of the Device Alarm State Requests, in accordance with an example embodiment;

FIG. 20 shows an exemplary Device Alarm State Table used by the second trigger to determine alarm condition, in accordance with an example embodiment;

FIG. 21 shows an exemplary table that illustrates working of the second trigger for alarm state changes in 20 minutes, in accordance with an example embodiment;

FIG. 23 shows an exemplary table comprising data processed by the triggers and recorded to the local database, according to an example embodiment;

FIG. 26 shows an exemplary table that illustrates commands associated with the plugin along with their corresponding command numbers and description, in accordance with an example embodiment;

DETAILED DESCRIPTION

Figure 1:
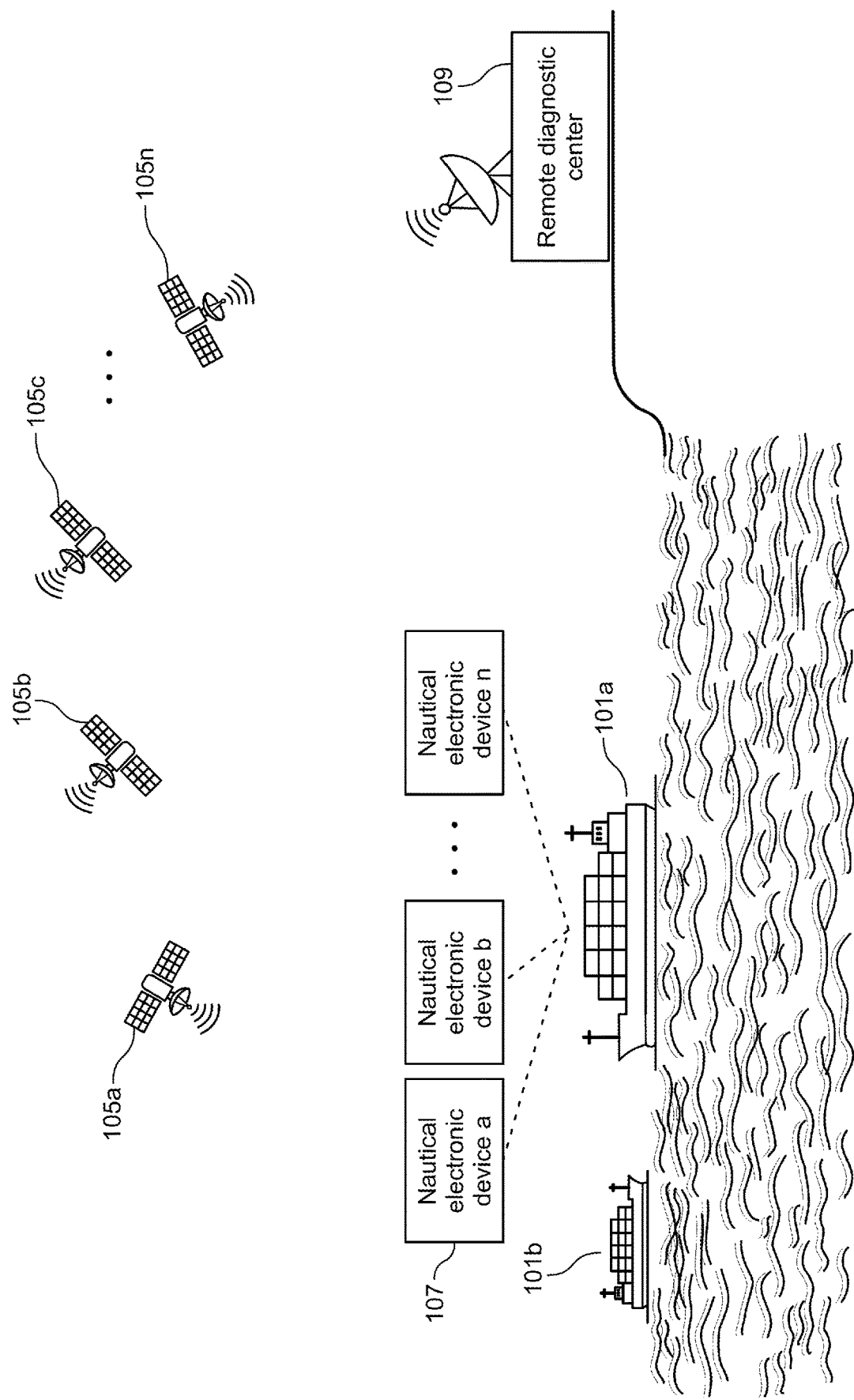
FIG. 1 is a schematic that illustrates a relationship between the diagnostic apparatus and the remote diagnostic centre for remotely monitoring one or more nautical electronic devices on a vessel, in accordance with an example embodiment.

In the following description, for purposes of explanation, numerous specific details are set forth in order to provide a thorough understanding of the present disclosure. It is understood, however, to one skilled in the art that the present disclosure may be practiced without these specific details. Other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for all.

Some embodiments of the present disclosure will now be described more thoroughly hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Further, the terms "processor", "controller" and "processing circuitry" and similar terms may be used interchangeably to refer to the processor capable of processing information in accordance with embodiments of the present disclosure. Further, the terms "electronic equipment", "electronic devices" and "devices" are used interchangeably to refer to electronic equipment monitored by the system in accordance with embodiments of the present disclosure. Thus, use of any such terms should not be a restriction to the spirit and scope of embodiments of the present disclosure.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

As used in this specification and claims, the terms "for example." "For instance." and "such as, and the verbs "comprising," "having" "including" and their other verb forms, when used in conjunction with a listing of one or more components or other items, are each to be construed as open ended, meaning that that the listing is not to be considered as excluding other, additional components or items. Other terms are to be construed using their broadest reasonable meaning unless they are used in a context that requires a different interpretation.

The proposed hybrid architecture for remote monitoring and support system provides ship owners and ship management firm direct access to and control over any kind of electronic equipment on the vessel. The hybrid architecture allows the remote monitoring and support system to collect critical data pertaining to the vessel through a smart device that is positioned on board the vessel. The data is then transferred to and stored on cloud databases and made available through a web portal. The status of the electronic equipment mounted on the vessel is constantly monitored by a remote diagnostic centre on land, and when an abnormality occurs, the cause of the failure is promptly analysed and arrangements for repair are made. The hybrid architecture is based on Internet of Things (IoT), which connects electronic equipment on board the vessel to the smart device, and the smart device to the web portal, which enables remote monitoring of the electronic equipment.

However, in order to implement efficient remote monitoring of the electronic equipment and obtaining correct troubleshooting instructions when required from the remote diagnostic centre in lesser time, the smart device is required to communicate directly with the remote diagnostic centre. Further, the smart device should be able to send only relevant information to the remote diagnostic centre, which can ensure timely troubleshooting and effective utilization of bandwidth provided for satellite communication between the smart device and the remote diagnostic centre.

The hybrid architecture for the remote monitoring system for the vessel provided herein uses the diagnostic apparatus that provides information associated with failure of one or more electronic equipment (or nautical devices) within the vessel using a direct satellite communication link to a remote diagnostic centre for remote monitoring and diagnosis of the one or more electronic equipment. The diagnostic apparatus is in communication with the one or more electronic equipment within the vessel. The diagnostic apparatus determines abnormalities in functioning of the one or more electronic devices. It further transmits information associated with the abnormalities associated with the one or more electronic devices directly to the remote diagnostic centre via the satellite communication link. The diagnostic apparatus in association with the database then obtains troubleshooting instructions associated with the abnormalities associated with the one or more electronic devices via the satellite communication link.

The hybrid architecture that provides direct communication between the vessel and the diagnostic centre enhances efficiency of diagnosing cause of the abnormalities of the one or more electronic devices because of the direct communication link. The direct communication enables providing real-time information associated with the failure of the devices and thus reduces the troubleshooting time. Effective diagnosis owing to the direct communication link between the diagnostic apparatus and the remote diagnostic centre may reduce time of troubleshooting when physical assistance is required to rectify the issue with the device at a port. In case of failure of the devices, crew will get a warning with troubleshooting advice, and finally if on board attendance is needed then the exact symptom of failure is identified before boarding and correct spare part is brought by the technician/engineer.

FIG. 1 is a schematic that illustrates a relationship between a diagnostic apparatus 103 and a remote diagnostic centre 109 for remotely monitoring one or more nautical electronic devices 107 on a vessel 101*a*, in accordance with an example embodiment. The one or more nautical electronic devices 107 (i.e., nautical electronic device (a), nautical electronic device (b), and nautical electronic device (n)) are mounted on the vessel 101*a* that is in communication with the remote diagnostic centre 109 via a satellite communication link including a plurality of satellites like a satellite 105*a*, a satellite 105*b*, a satellite 105*c*, and a satellite 105*n*. The one or more nautical electronic devices 107 may be mounted on a plurality of vessels such as the vessel 101*a* and a vessel 101*b*. The satellite communication link via a plurality of communication satellites 105 (*a*)-(*n*) can be appropriately selected, for example, by using an iridium satellite communication system or Inmarsat. In some embodiments, a plurality of satellite communication links may be selected for communication between the vessel 101*a* and the remote diagnostic centre 109. The communication between the diagnostic apparatus 103 and the remote diagnostic centre 109 may be a satellite communication link in the entire link or a part of the link may include a satellite communication link.

A hybrid architecture for a remote diagnostic system of the present disclosure uses the diagnostic apparatus 103 that provides information related to the failure of the one or more nautical electronic devices 107 on the vessel 101*a* by using the satellite communication link for connecting directly to the remote diagnostic centre 109 for remotely monitoring and diagnosing faults in the one or more nautical electronic devices 107. A detailed analysis of the hybrid architecture for remote monitoring of the vessel 101a is given below with reference to FIG. 2.

Figure 2:
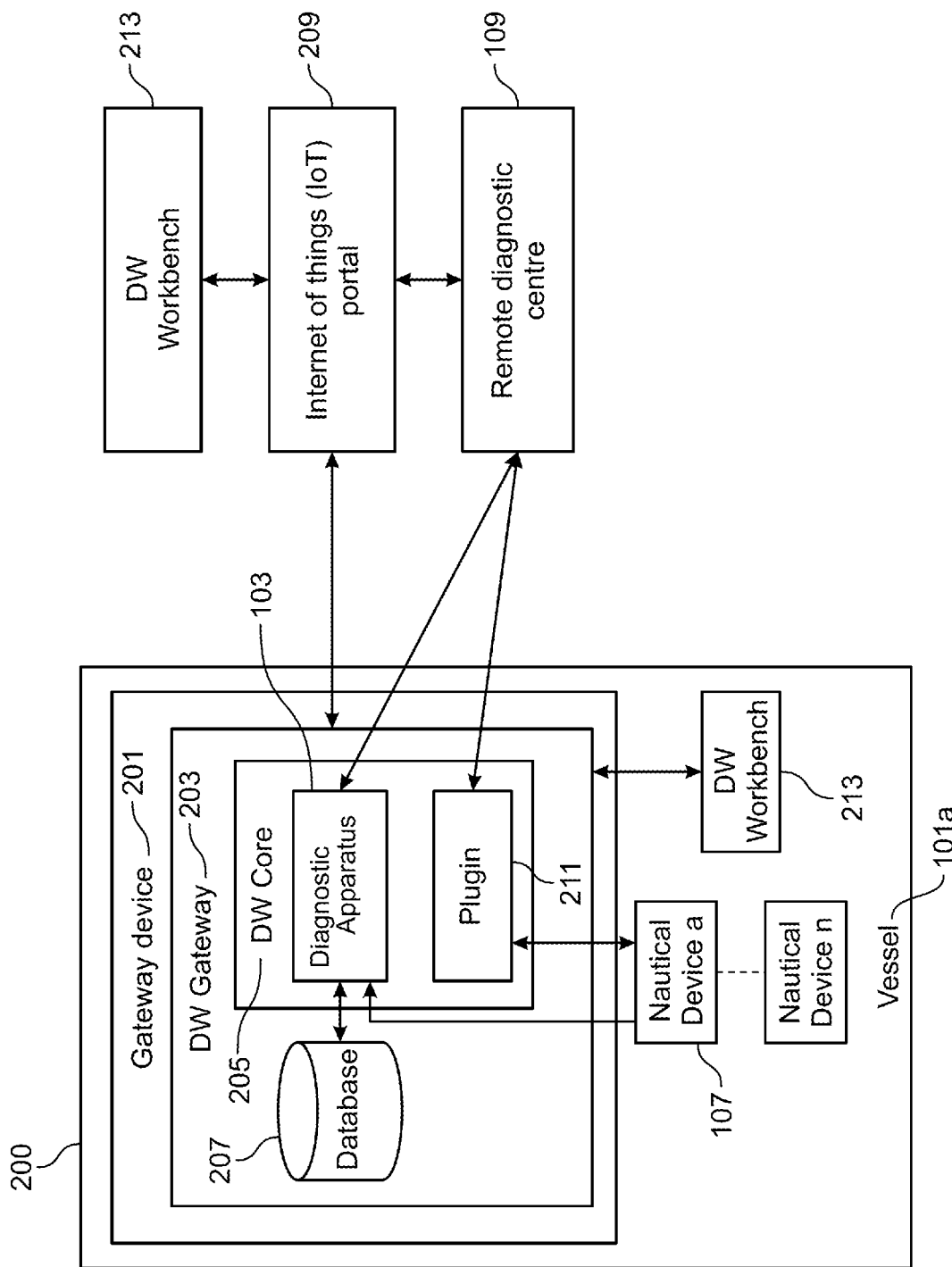
FIG. 2 is a schematic that illustrates a hybrid architecture implemented for remote monitoring of the vessel, in accordance with an example embodiment.

FIG. 2 is a schematic that illustrates a hybrid architecture 200 implemented for remote monitoring of the vessel 101a, in accordance with an example embodiment. The hybrid architecture 200 comprises communication links among the vessel 101a, the remote diagnostic centre 109, and an Internet of Things (IoT) portal 209. The remote diagnostic centre 109, remotely located on land, monitors one or more nautical electronic devices 107 within the vessel 101a in a sea. The vessel 101a comprises a gateway device 201, which is the hardware (smart device) that collects data from one or more nautical electronic devices 107. The gateway device 201 comprises a DW Gateway 203, a component that acts as a gateway device and has access to the devices and acts as an intermediate among a user and one or more nautical electronic devices 107, where the user is notified about failure of the one or more nautical electronic devices 107. The DW Gateway 203 comprises a DW Core 205, which is a sub-module of the DW Gateway 203 that acts as an intermediate between any application that is used to connect users to the DW Gateway 203 in order to monitor the one or more nautical electronic device 107, which means that bringing data from the edge to the business application. Further, the DW Core 205 may be implemented at a computer operable unit installed at the vessel 101a. The DW Gateway 203 further comprises a database 207 in direct communication with the DW Core 205.

The DW Core 205 comprises the diagnostic apparatus 103 and plugin 211. The proposed hybrid architecture 200 allows the diagnostic apparatus 103 to transmit information related to the failure of the one or more nautical electronic devices 107 directly to the remote diagnostic centre 109. The direct link between the diagnostic apparatus 103 and the remote diagnostic centre 109 enhances system portability and simplifies the overall architecture, because the hybrid architecture 200 eliminates intermediate point of failures that may cause risks in providing troubleshooting instructions.

Further, the hybrid architecture 200 enhances security of the overall remote monitoring system by utilizing data protection and password policy, such as while accessing information related to one or more nautical electronic devices 107. It further ensures proper segregation of traffic between traffic data routed to the remote diagnostic centre 109 via a first satellite communication link and traffic data routed to the IoT portal 209 via a second satellite communication link. The advantage of segregating the traffic into data to be sent to the remote diagnostic centre 109 and data to be sent to the IoT portal 209, using two different satellite communication links is that the hybrid architecture utilizes strengths of each platform (109 and 209). The remote diagnostic centre 109 provides user interface, data analytics, and troubleshooting, whereas the IoT portal 209 provides device management and connectivity management. In an example embodiment, the remote diagnostic centre 109 may comprise the IoT portal 209.

The diagnostic apparatus 103 may receive one or more messages from the one or more nautical electronic devices 107, where each message comprises a combined identification data and specification data for communication between the one or more nautical electronic devices 107 on the vessel 101a. The combined identification data and the specification data for communication are based on National Marine Electronics Association (NMEA) 0183 message. The diagnostic apparatus 103 detects failure of the one or more nautical devices 107 based on the combined identification data and specification data. The diagnostic apparatus 103 then transmits information associated with the failure of the one or more nautical electronic devices 107 to the remote diagnostic centre 109. The information associated with the failure of the one or more nautical electronic devices 107 is transmitted using a first satellite communication link.

Further, the diagnostic apparatus 103 on reception of the one or more messages from the one or more nautical electronic devices 107, determines a type of message to be parsed, and parses the one or more messages accordingly. The type of messages may be at least one of a unicast message type and a multicast message type. The unicast message type is associated with a one-to-one transmission from the one or more nautical electronic device 107 to the diagnostic apparatus 103, whereas the multicast message type is associated with a group communication, where data transmission is addressed to a group of nautical electronic devices 107 simultaneously.

The diagnostic apparatus 103 further identifies the NMEA 0183 message encapsulated in each message of the one or more messages, based on the parsing. The diagnostic apparatus 103 compares the NMEA 0183 message type against a predefined set of valid NMEA 0183 message types. When the NMEA 0183 message type belongs to the predefined set of valid NMEA 0183 message types, the diagnostic apparatus 103 continue parsing the NMEA 0183 message. When the NMEA 0183 message type does not belong to the predefined set of valid NMEA 0183, the diagnostic apparatus 103 ignores the message. The predefined set of valid NMEA 0183 message types may comprise alarm type, property type, and connected type. The diagnostic apparatus 103 executes triggers on reception of the alarm type message to determine whether there is a failure of the one or more nautical electronic devices 107. Further, the diagnostic apparatus 103 determines identity of the device under failure by parsing the message. The diagnostic apparatus 103 further determines whether to publish alarm condition associated with the one or more nautical electronic devices 107 to the remote diagnostic centre 109.

The diagnostic apparatus 103 may be configured to compare current alarm state (ON or OFF) of the one or more nautical electronic devices 107 with the previous alarm state of the device, when there is a change in the alarm state, and the current alarm state indicates failure of the device, the diagnostic apparatus 103 publishes the alarm condition associated with the device under failure to the diagnostic centre 109.

Further, the diagnostic apparatus 103 stores the current alarm state and the previous state for one or more messages, in the database 207. In time spans where the diagnostic apparatus 103 is disconnected with the remote diagnostic centre 109, the database 207 can keep the data locally until the diagnostic apparatus 103 regains connectivity to the remote diagnostic centre 109. The database 207 may also store information such as type of device, identity of the device, location of the device, or the likes, which may be used by the diagnostic apparatus 103. The diagnostic apparatus 103 may update the current alarm state and the previous alarm state, each time the one or more messages are received. Further, the diagnostic apparatus 103 transmits information associated with the device failure to the remote diagnostic centre 109 via the first satellite-communication link.

Further, a structure of the message corresponding to the type of message is predefined. Therefore, when the diagnostic apparatus 103 receives for example the multicast type messages, the diagnostic apparatus 103 parses these messages according to a structure of message predefined for the multicast type messages. Similarly, the structure of unicast type messages is also predefined.

Further, the plugin 211 expands DW Core 205 functionality, as the plugin 211 is used to communicate and interact with one or more nautical electronic devices 107. The plug in 211 may receive one or more commands from users, where the commands may correspond to specific actions to be executed by the one or more nautical electronic devices 107. Thus, the plugin 211 sends one or more commands to the one or more nautical electronic devices 107. Further, the plugin 211 handles the data returned by the one or more nautical electronic devices 107, and further provides the corresponding results to the user who requested them. The user may be the crew member within the vessel 101a or engineers operating at the remote diagnostic centre 109. The plug in 211, the DW core 205 and the diagnostic apparatus 103 may each be implemented as a hardware, a software, or a combination of both hardware and software in various embodiments, without deviating from the scope of the disclosure.

In some embodiments the various components of the DW Core 205 may be implemented as different software modules, the code for the different modules may be modified by developers depending upon the requirements of the users in order to create their own components, modules, and a plugin to communicate and interact with the one or more nautical electronic devices 107. The users may comprise providers of the one or more nautical electronic devices 107 within the vessel 101a, a ship making company that supplies vessels, or the likes. The DW Core 205 has direct access to the one or more nautical electronic devices 107 and acts as intermediate among the users, the one or more triggers and the one or more nautical electronic devices 107. In some embodiments, the DW Core 205 acts as an intermediate between different plugins and the one or more nautical electronic devices 107, where the plugins are used for communication with the one or more nautical electronic devices 107.

The DW Gateway 203 provides connectivity to the IoT portal 209 for device management services and connectivity management services that are used to manage connectivity of the diagnostic apparatus 103 to the remote diagnostic centre 109. The second satellite communication link is used to segregate traffic to the IoT portal 209 from the traffic to the remote diagnostic centre 109 in order to increase efficiency of transmitting information associated with the failure of the one or more nautical electronic devices 107 to the remote diagnostic centre 109. The second satellite-communication link may be used by authorized personnel at the remote diagnostic centre 109 to support large scale device management and connectivity management requirements of multiple event trigger devices that are installed at multiple vessels for remote monitoring of those vessels. The connectivity management services may use TR-50 protocol to manage connectivity services. Further, through device management, users can launch software update packages, add license to the DW Gateway 203 and get the gateway device 201 hardware information. The DW Gateway 203 receives corresponding data from the one or more nautical electronic devices 107 which is provided to the user.

The DW Gateway 203 and IoT Portal 209 connects with the DW Workbench 213. The DW Workbench 213 acts as a "client" of a request, where the request may be such as a request to access the alarm state information using a trigger or the likes. The DW Workbench 213 provides a graphical user interface (GUI) to the users to implement specific trigger algorithm for the diagnostic apparatus 103, one or more procedures, and actions to be performed on the one or more nautical electronic devices 107. The DW Workbench 213 also provides configuration information to the plug in 211 which communicates and interacts with the one or more nautical electronic devices 107.

Further the remote diagnostic centre 109 is configured to receive the information associated with the failure of the one or more nautical electronic devices 107 in the form of messages. The remote diagnostic centre 109 analyses messages received from the vessel 101a. The remote diagnostic centre 109 further parses the message and determines failure of the one or more nautical electronic devices 107 that are identified by the diagnostic apparatus 103. On obtaining the information associated with the failure of the one or more nautical electronic devices 107, the remote diagnostic centre 109 obtains troubleshooting instructions from local databases at the remote diagnostic centre 109 and provides the troubleshooting instructions to the vessel 101a via the first satellite communication link. In some cases, the remote diagnostic centre 109 provides information associated with the failure of the one or more nautical electronic devices 107 to diagnostic engineers. Further, the remote diagnostic centre 109 allows the diagnostic engineers to provide troubleshooting instructions to one or more crew members at the vessel 101a. The troubleshooting instructions are provided to the one or more crew members at the vessel 101a by using the first satellite communication link. In this manner, the remote diagnostic centre 109, which may be located on land, is configured to monitor one or more nautical electronic devices 107 on the vessel 101a in the sea.

Figure 3:
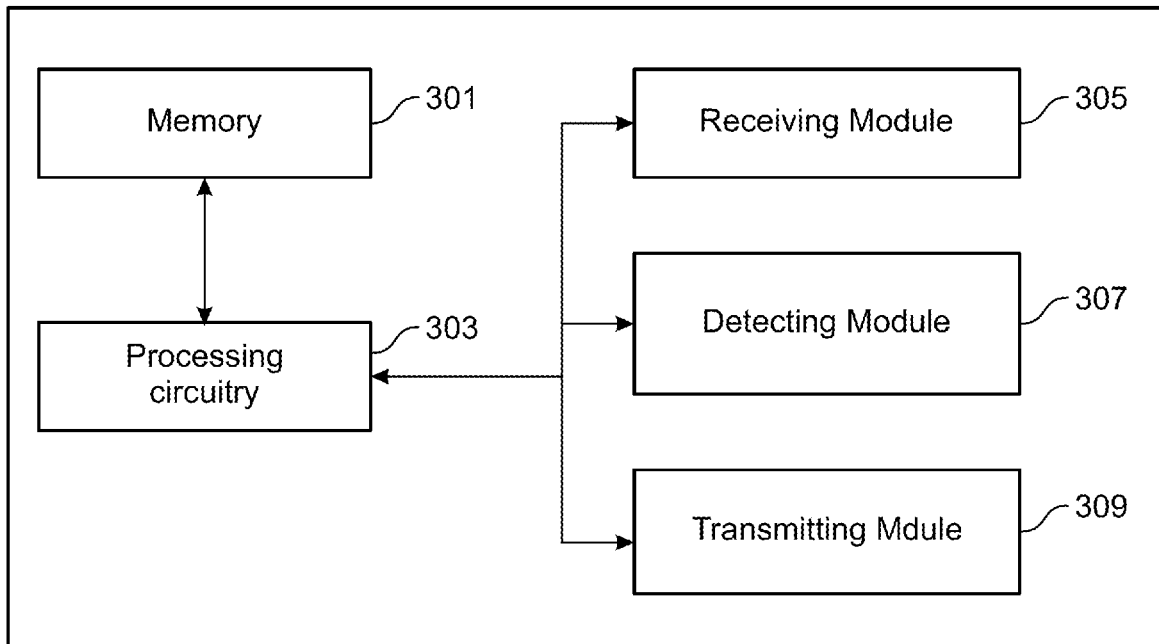
FIG. 3 is a schematic that illustrates a block diagram of the diagnostic apparatus 103, in accordance with an example embodiment.

FIG. 3 is a schematic that illustrate a block diagram of the diagnostic apparatus 103, in accordance with an example embodiment. The diagnostic apparatus 103 comprises memory 301 configured to store instructions, and processing circuitry 303 configured to execute the stored instructions. The diagnostic apparatus 103 further comprises a receiving module 305, a detecting module 307, and a transmitting module 309. The processing circuitry 303 is connected to other components (301 and 305-309) of the diagnostic apparatus 103 via a bus. The receiving module 305 is configured to receive one or more messages from the one or more nautical electronic devices 107, where each message comprises a combined identification data and specification data for communication between the one or more nautical electronic devices 107 on the vessel 101a. Further, the detecting module 307 is configured to detect failure of the one or more nautical electronic devices 107 based on the combined identification data and specification data.

To that end, the detecting module 307 is further configured to compare each message type with a target message type, where when the message type matches the target message type, the detecting module 307 is configured to parse the message and when the message type does not match the target message type, the detecting module 307 is configured to ignore the message. The detecting module 307 parses the message in order to determine occurrence of an alarming event indicating failure of the one or more nautical electronic devices 107. To achieve this, the detecting module 307 is configured to run triggers.

The detecting module 307 comprises a first trigger and a second trigger. The first trigger is configured to operate constantly as a background process to receive one or more messages from the one or more nautical electronic devices 107, wherein each message from the one or more messages comprises an alarm state data, and wherein the first trigger is configured to process the message based on a comparison of a current alarm state to a previous alarm state using the alarm state data. The first trigger is explained in detail with reference to FIG. 17 later. The detecting module 307 is further configured to store the current states and previous states of all alarms, in the database 207, and to update the current alarm state and the previous state, each time the one or more messages are received.

The second trigger is configured to operate at scheduled intervals of time to receive one or more messages from the one or more nautical electronic devices 107 (also interchangeably referred to as one or more nautical electronic devices 107). The second trigger is configured to process the message to check whether there is a change in the alarm state data between a last scheduled timestamp and a current scheduled timestamp. Further, the detecting module 307 is configured to transmit the message with information associated with failure of the one or more nautical electronic devices 107 to the remote diagnostic center 109 based on the processing of the message by the first trigger and the second trigger. Further, the diagnostic apparatus 103 uses a transmitting module 309 configured to transmit information associated with the failure of the nautical electronic device 107 to the remote diagnostic centre 109. The transmitting module 309 is configured to use a first satellite communication link to transmit the information associated with the failure of the one or more nautical electronic device 107 to the remote diagnostic centre 109. The diagnostic apparatus 103 determines the relevant information associated with the failure using the first trigger and the second trigger. The diagnostic apparatus 103 then transmits only the relevant information associated with the failure of the device to the remote diagnostic centre 109. These triggers may be any of one or more of a software processes, a subroutine, a function, a service, and an algorithm, that are executed on reception of the one or more alert type messages. The triggers may be defined using the plug in 211 which is part of the DW Core 205. A detailed functioning of the DW Core 205 is provided below with reference to FIG. 4.

Figure 4:
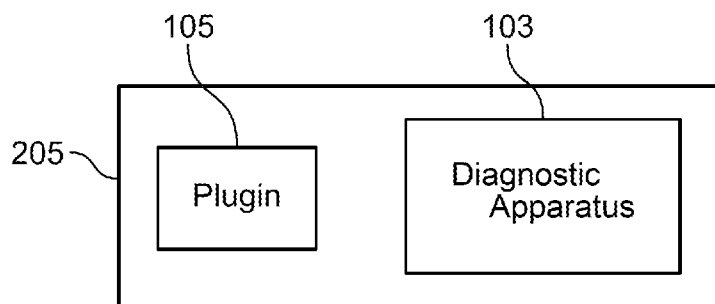
FIG. 4 illustrates components of the DW Core, in accordance with an example embodiment.

FIG. 4 illustrates components of the DW Core 205, in accordance with an example embodiment. As can be observed from the figure, the DW Core 205 comprises two components: the plug in 211 and the diagnostic apparatus 103.

In an embodiment, the plugin 211 is configured to use one or more plugins to communicate with the one or more devices. In an example embodiment, the plugin 211 uses four plugins to communicate with the one or more nautical electronic devices 107 at the vessel 101a. The four plugins implement four separate commands. The plugin 211 uses the plugins to send corresponding commands, through the DW Core 205, to the one or more nautical electronic devices 107. Further, the one or more nautical electronic devices 107 return the corresponding data to the plug in 211. The plugins are responsible, not only for communication between the one or more nautical electronic devices 107 but also for handling the data returned by the one or more nautical electronic devices 107. As all the communications between the plug in 211 and the one or more nautical electronic devices 107 is performed through a network, there is a need to establish a secure connection between the plug in 211 and the one or more nautical electronic devices 107.

Figure 5:
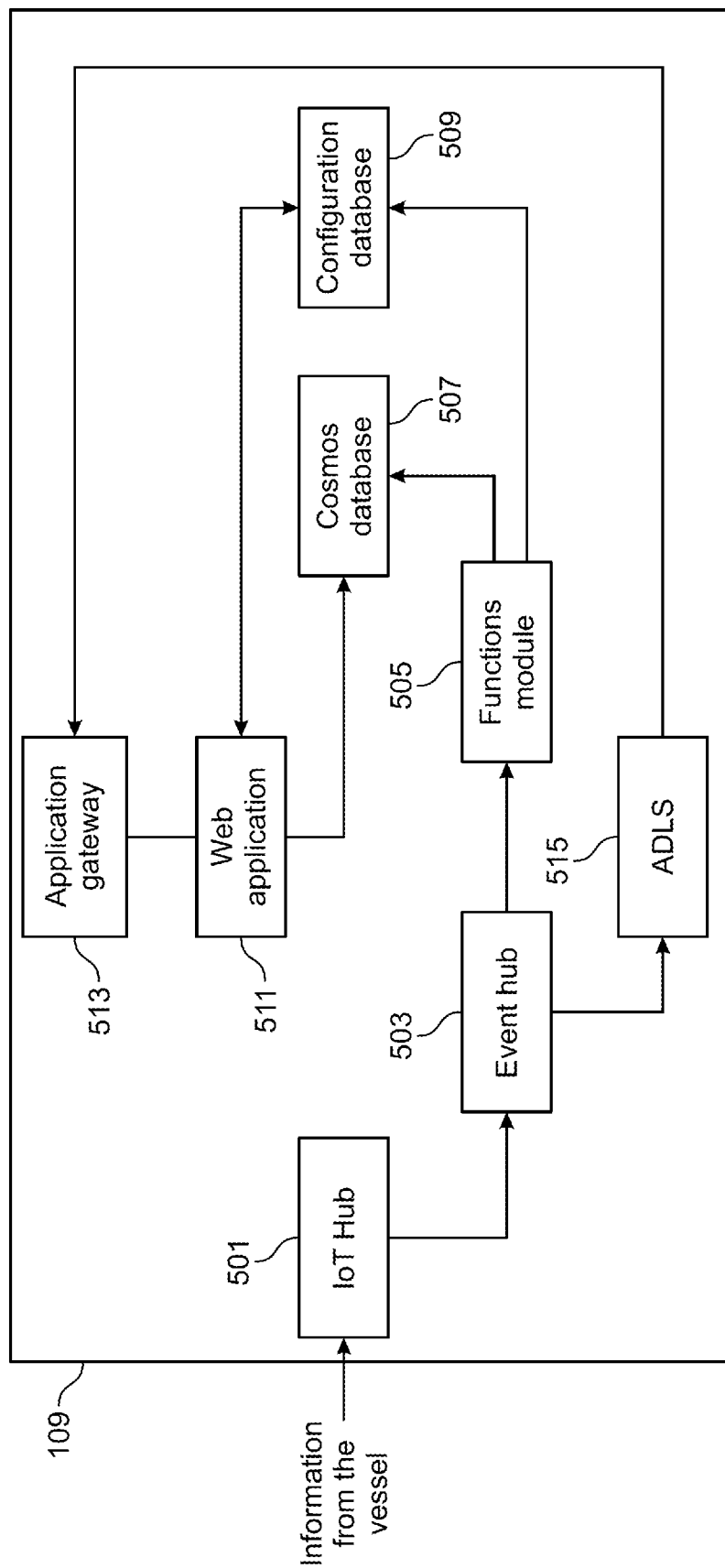
FIG. 5 illustrates different components comprised by the remote diagnostic centre 109, in accordance with an example embodiment.

FIG. 5 illustrates different components comprised by the remote diagnostic centre 109, in accordance with an example embodiment. The remote diagnostic centre 109 comprises an Internet of Thing (IoT) hub 501, an event hub 503, a functions module 505, a cosmos database 507, a configuration database 509, a web application 511, an application gateway 513, and an Azure data lake storage (ADLS) 515. The IoT hub 501 obtains the information associated with the device failure from the vessel 101a. This information may be used by the remote diagnostic centre 109 to determine the cause of the device failure, and further to provide instructions for troubleshooting the device failure. The IoT hub 501 is a central management location for the one or more nautical electronic devices 107 within the vessel 101a. The IoT hub 501 has several capabilities such as: device authentication/authorization, device provisioning, bi-directional communication with the DW Core 205, module registry, device twining, or the likes. The IoT hub 501 routes data to the event hub 503. The IoT hub 501 may be configured as a remote receiving module configured for receiving one or more messages from the vessel 101a. The messages include information related to failure of the one or more nautical electronic devices 107, such as information about cause of device failure.

The event hub 503 may be configured to consume data coming from the IoT hub 501, such as in the form of messages. The IoT hub 501 has only a single event hub 503 endpoint, which is connected to the function's module 505. The event hub 503 stores the information associated with failure of the one or more nautical electronic devices 107 in the Azure data lake storage (ADLS) 515 and Azure cosmos database 507.

The functions module 505 process data points coming from the event hub 503 and forward them to the cosmos database 507. The functions module 505 acts as a remote analysing module which is configured for analysing the received one or messages from the event hub 503, which were in turn coming from the IoT hub 501. The functions module 505 may be implemented using NET CORE on Microsoft Azure portal. The functions module 505 is used as a server less compute option. The functions module 505 is configured to process data received from the event hub 503, coordinate with different systems for IoT operations, and integrate various processes and systems. The functions module 505 further enables building simple application interface and micro services. The functions module 505 may use stream analytics that provide more options and features that enables implementing more functionalities at the remote diagnostic centre 109. The functions module 505 is further used in event driven programming and are triggered by http requests, timers, event hub inputs (which are the triggers of the implemented functions in the functions module 505), and the likes. The functions module 505 may further enable processing the input and save it in the storage of user's choice. The functions module 505 provides the ability to manipulate the input data, map it with data from the application's configuration database 509 and add real-time functionality such as email alerts to the users subscribed to a vessel's high-risk alerts.

The cosmos database 507 is a database based on the Azure platform. It is a globally distributed, multi-model database service. It is extremely fast in query execution, allowing for multi-master replication across any Azure region, it enables fast query execution delivered to the user's location. It is equipped to handle Internet of Thing (IoT) based scenarios, which usually rely on JSON document telemetry. The cosmos database 507 may serve as the primary data store for web application 511. The web application 511 is a remote application module configured for parsing and analysing messages coming from the function's module 505. The cosmos database 507 also stores the "raw" data from the diagnostic apparatus 103, allowing for more rich analytics capturing deeper and more descriptive data points (pre-aggregated data points).

The remote diagnostic centre 109 comprises the configuration database 509. It may be based on the Azure platform. The configuration database 509 hosts the configuration database for the web application 511. Further, it hosts the mapping of one or more of the users, the customers, the vessels 101*a*, and the equipment and the latest alerts in order to have a quick retrieval for presentation.

The web application 511 obtains all the information associated with the failure of the one or more nautical electronic devices 107, such as in the form of parsed messages, from the different databases as discussed above. The web application 511 further uses this information to determine possible causes of the failure of the one or more nautical electronic devices 107. Further, the web application 511 provides instructions for troubleshooting the failure of the one or more nautical electronic devices 107 via the first satellite-communication link. In another embodiment, the web application 511 provides the obtained information to engineers, who may provide step by step instructions for troubleshooting the failure of the one or more nautical electronic devices 107 to one or more crew members at the vessel 101*a*.

The web application 511 may be hosted on Azure Web Apps that allows for flexible web hosting of the portal. The Azure Web Apps provides the features like, auto-scaling of the web application 511. By using user-defined rules, the web application 511 can be scaled out and in, depending on the incoming requests from the portal users. Further, newer versions of the application can be deployed side-by-side with the old version, allowing testing-in-production to happen seamlessly without disrupting normal operations. In some embodiments, CI/CD scenarios may be easily enabled with Azure Devops, Git, TFS, Github and more.

In an example embodiment, the remote diagnostic centre 109 may comprise Azure application insights. The Azure application insights may comprise an extensible Application Performance Management (APM) service for web development on multiple platforms. The Azure application insights may be used to provide functions such as monitoring of live web applications, automatically detect performance anomalies, perform powerful analytics that help to diagnose issues and to understand what users actually do with the web application 511 and the like. The Azure application insights may provide support for a wide variety of programming technologies such as .NET, Node.js and Java EE, hosted on-premises, hybrid, or any public cloud.

The application gateway 513 offers a web application firewall (WAF) that provides centralized protection of the web application 511 from common exploits and vulnerabilities. It protects the web application 511 from being targeted by malicious attacks that exploit commonly known vulnerabilities. Some common attacks from which the application gateway 513 provides protection from are SQL injection and cross-site scripting.

The Azure Data Lake Storage (ADLS) 515 is a highly scalable data storage solution. It allows storage of data in any format with unlimited capacity. This coupled with an architecture built for Big Data and Advanced Analytics scenarios provide high performance services for handling large volumes of data, such as the data coming from the vessel 101*a*. To that end, the ADLS 515 may be used to store the raw data points coming from the event hub 503 so that services such as Machine Learning Services can take advantage of this data.

In an example embodiment, the remote diagnostic centre 109 may further comprise one or more business intelligence tools such as PowerBI, for reporting/dashboard presentation to the engineers. The tool can embed to the web application 511 and get data from the ADLS 515. The remote diagnostic centre 109 may use the business intelligence tools to provide dashboard presentation of failure of the one or more nautical electronic devices 107 to the engineers, which may enable easier understanding of the cause of the failure. Consequently, enabling the engineer to provide effective troubleshooting instructions to the crew members at the vessel 101*a*.

Figure 6:
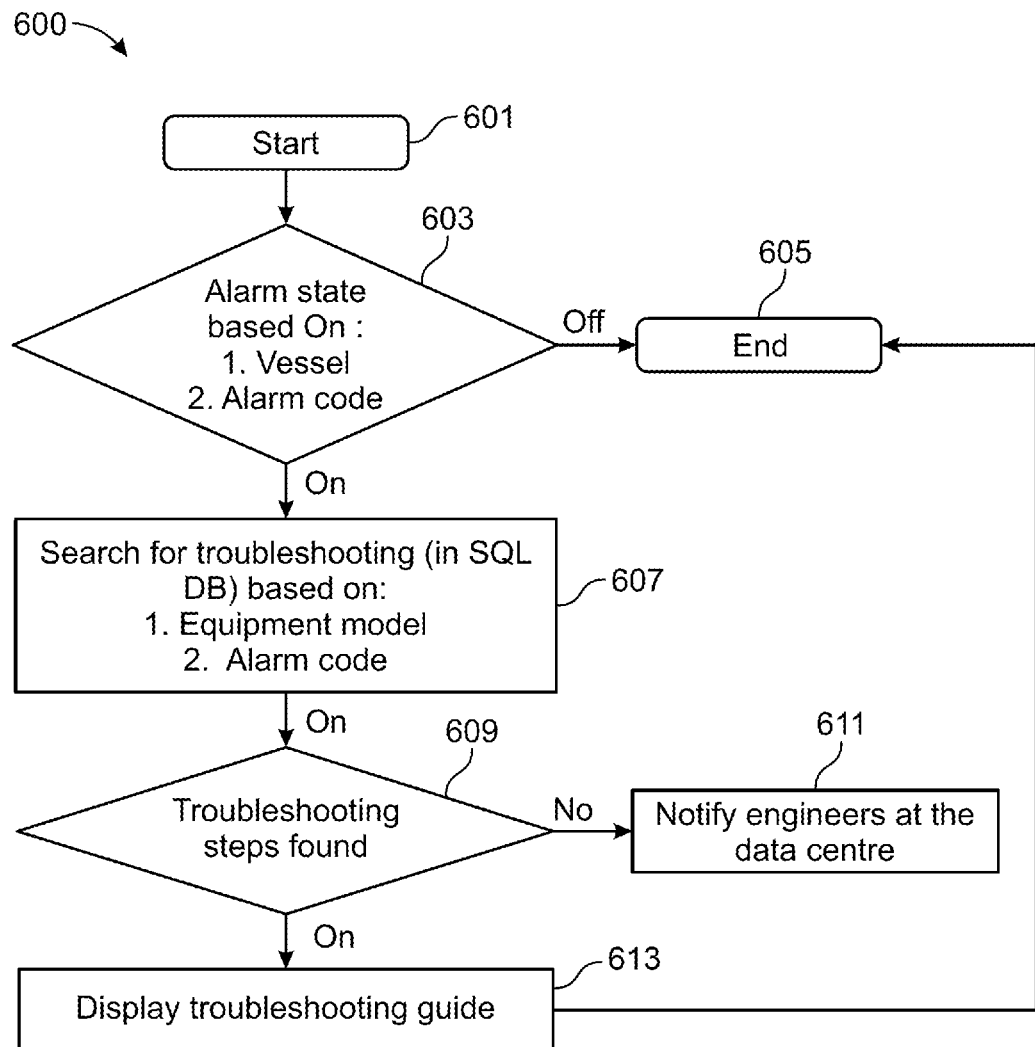
FIG. 6 illustrates steps of a method executed by the remote diagnostic centre for providing troubleshooting instructions, in accordance with an example embodiment.

FIG. 6 illustrates steps of a method 600 executed by the remote diagnostic centre 109 for monitoring one or more nautical electronic devices 107 on the vessel 101*a* and providing troubleshooting instructions, in accordance with an example embodiment. The method 600 starts at step 601 on reception from the vessel 101*a* of the one or more messages, such as alarm type messages comprising information about failure of the one or more nautical electronic devices 107. At step 603, based on the received alarm state; it may be determined whether the alarm state is on or off. When the alarm state is off, the method ends at step 605. When the alarm state is on, the method proceeds to step 607. At step 607, the one or more messages may be analyzed, such as by searching for the troubleshooting instructions in the configuration database 509 based on equipment model and alarm code received in the one or more messages. In some embodiments, the remote diagnostic centre 109 may obtain the equipment model and alarm code directly from the vessel 101*a* via the first satellite link. Further, at step 609, troubleshooting information may be determined for remote monitoring of one or more nautical electronic devices 107 based on the analysis of the one or more messages. For example, it may be determined whether the troubleshooting steps are found or not. When the troubleshooting steps are not found in the database, then at step 611 the engineers at the remote diagnostic centre 109 may be notified to provide the troubleshooting steps. The engineers may determine the troubleshooting steps and provide them to the one or more crew members at the vessel 101*a* via the first communication link. When the troubleshooting steps are found in the configuration database 509, then at step 613, the troubleshooting guide is displayed to the one or more crew members at the vessel via the first satellite link.

Figure 7:
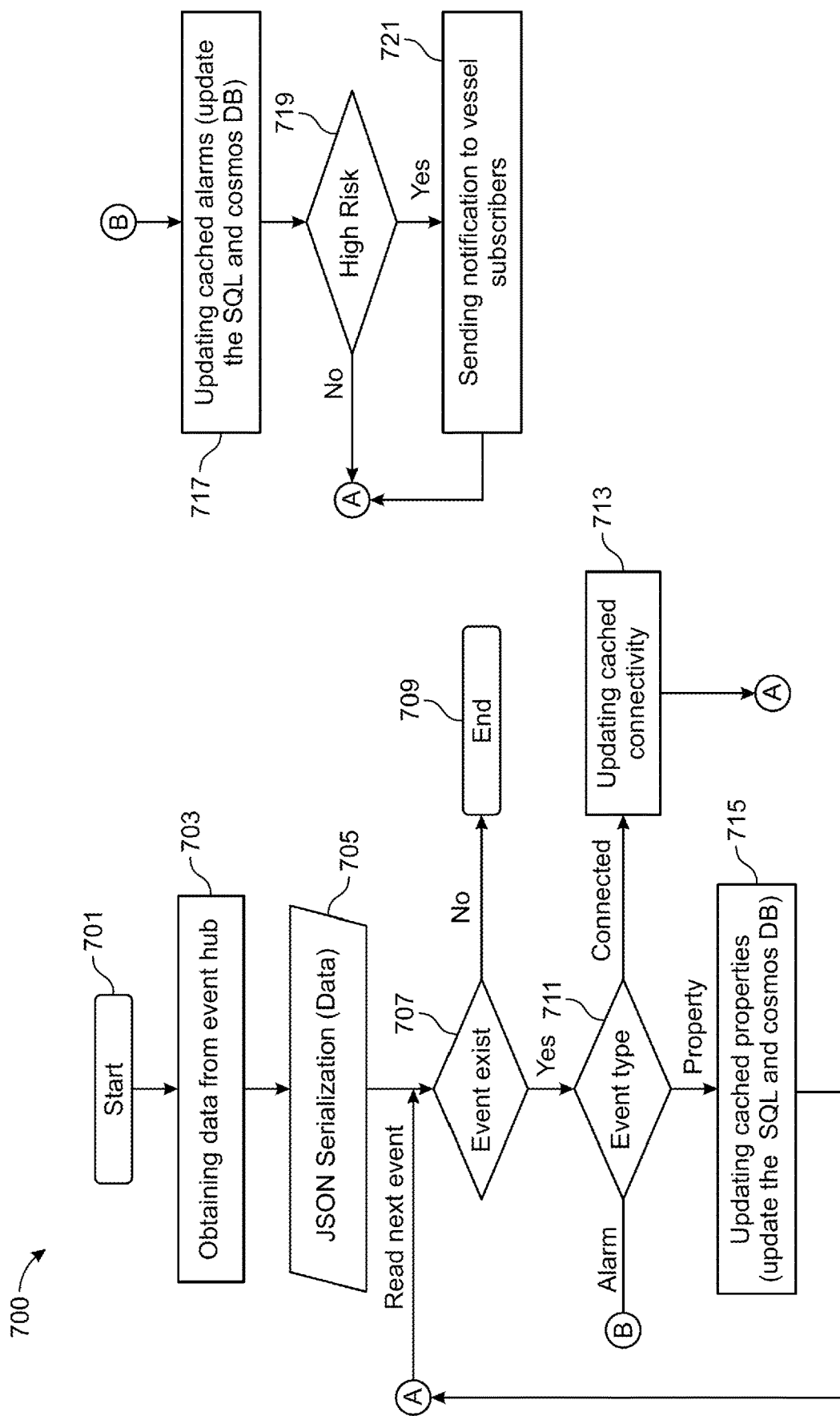
FIG. 7 illustrates steps of a method executed by the remote diagnostic centre for providing notification to the vessel subscribers, in accordance with an example embodiment.

FIG. 7 illustrates steps of a method 700 executed by the remote diagnostic centre for providing notification to the vessel subscribers, in accordance with an example embodiment. The method starts at step 701. At step 703, the method includes obtaining data from the event hub 503. The data may comprise information associated with failure of the one or more nautical electronic devices 107 within the vessel 101*a*. At step 705, serialization of the data may be performed. At step 707, it may be determined whether any event exists. On determining that the event does not exist, the method ends at step 709. On the other hand, when the event exists, the method proceeds to step 711. At step 713, a type of the event may be determined. When the event type is "Connected", then at step 713, cached connectivity may be updated, and then the method continues to read the next event. When the event type is "Property", then at step 715, cached properties may be updated, and then the method continues to read the next event.

Further, when the event type is alarm, the method proceeds to step 717. At step 717, cached alarms may be updated. Further, for the detected alarm event, at step 719, it may be determined whether the alarm event corresponds to a high-risk event. When the alarm event does not correspond to the high-risk event, the method may continue to read the next alarm event. On the other hand, when the alarm event corresponds to the high-risk event, the method proceeds to step 721. At step 721, a notification associated with the alarm event may be sent to subscribers of the vessel 101*a*. The notification may be in the form of email, SMS, or the likes. The subscribers of the vessel 101*a* may comprise owner of the vessel 101*a*, vessel manufacturers, or the likes. The method then continues to read the next event.

Figure 8:
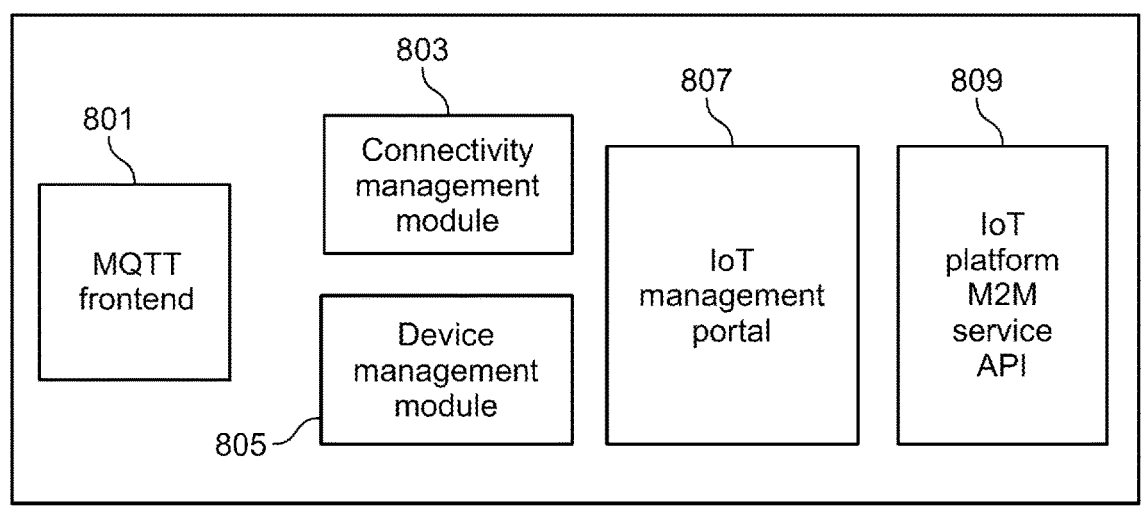
FIG. 8 is a schematic that illustrates block diagram of the IoT portal for remote monitoring of the vessel, in accordance with an example embodiment.

FIG. 8 is a schematic that illustrates block diagram of the IoT portal 209 for remote monitoring of the vessel 101*a*, in accordance with an example embodiment. The IoT portal 209 is used for providing device management and connectivity management via the second satellite communication link between the DW Gateway 203 and the IoT portal 209.

To that end, the diagnostic device 103 is configured to transmit IoT portal data to the IoT portal 209 via the second satellite communication link. The IoT portal data comprises device management data and connectivity management data for managing connectivity between the one or more nautical electronic devices, the diagnostic apparatus 103, and the first satellite communication link.

The IoT portal 209 comprises a Message Queuing Telemetry Transport (MQTT) frontend 801, a connectivity management module 803, a device management module 805, an IoT management portal 807, and an IoT platform machine-to-machine (M2M) service application interface (API) 809. The IoT portal 209 is in communication with the remote diagnostic centre 109. The MQTT frontend 801 uses a MQTT protocol to establish the communication between the IoT portal 209 and the gateway device 201.

The MQTT is extremely simple, and a lightweight publish/subscribe messaging protocol, designed for constrained devices and low-bandwidth, high-latency, or unreliable networks. The design principles are to minimise network bandwidth and device resource requirements whilst also attempting to ensure reliability and some degree of assurance of delivery. These principles also turn out to make the protocol ideal for "machine-to-machine" (M2M) or "Internet of Things" related applications, and for applications where bandwidth and power are at a premium. The basic advantage of MQTT protocol is that it is lightweight. It was designed for devices that had very little resource bandwidth. Further, it is a default standard for communication in IoT world.

The MQTT protocol is also used by the connectivity management module 803 and the device management module 805 for large scale connectivity management and device management for multiple diagnostic apparatuses installed at multiple vessels. The device management module 805 is configured to analyse the device management data for managing connection between the one or more nautical electronic devices and the diagnostic apparatus 103, whereas the connectivity management module 803 is configured to analyse the connectivity data for managing connection between the diagnostic apparatus 103 and the first satellite communication link.

Further, the IoT management portal 807 is a web-based application that may be used to view and manage all the DW Gateways and connections that are connected to the IoT Portal 209. With the use of the IoT management portal 807 viewing and managing all DW Gateways that are connected to the IoT Portal 209 is easily done. The IoT management portal 807 not only helps with the managing of devices but also the management of users, update firmware, and all of the other batch type processing that is required to be performed on the diagnostic apparatuses.

Further, the IoT Platform M2M Service API 809 comprises set of APIs that are used to enable new devices for example new gateway device to connect to the IoT portal 209 and to enable mobile and desktop applications to interact with the available data. Thus, the IoT Platform M2M Service API 809 is used by an application program to interface with the IoT Portal 209.

Figure 9:
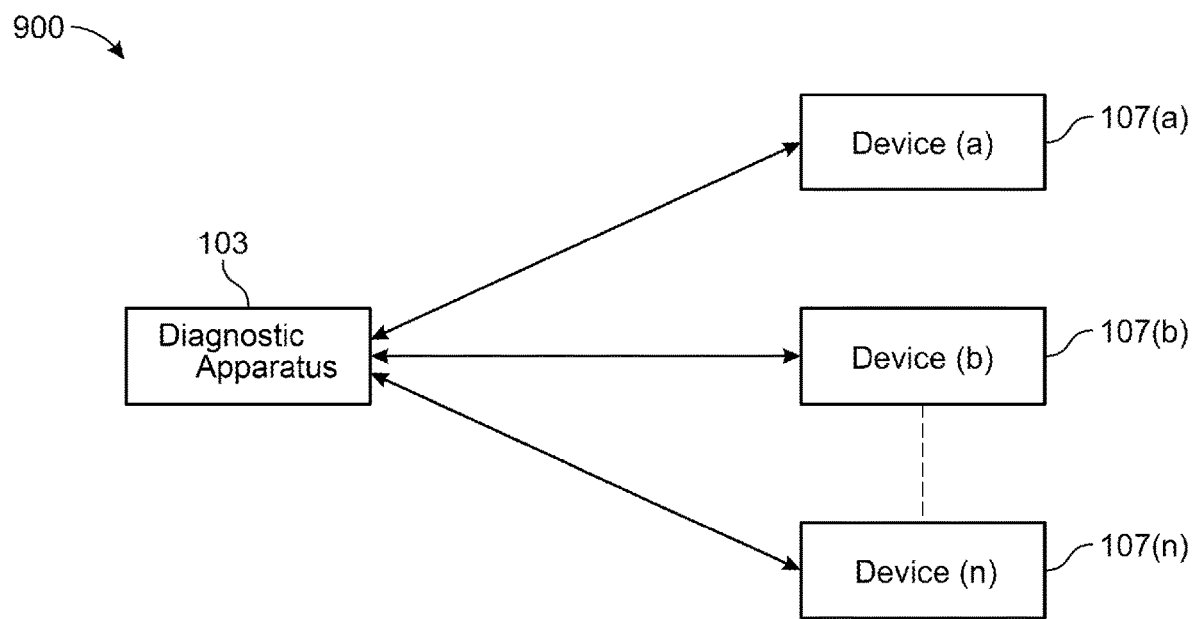
FIG. 9 is a schematic diagram that exemplarily illustrates the diagnostic apparatus in communication with the one or more nautical electronic devices, in accordance with an example embodiment.

FIG. 9 is a schematic diagram 900 that exemplarily illustrates the diagnostic apparatus 103 in communication with the one or more nautical electronic devices 107(*a*)107(*n*), in accordance with an example embodiment. The diagnostic apparatus 103 may act as a server that constantly listens to the network and waits for data from the one or more nautical electronic devices device (a)107(*a*), device (b) 107(*b*), and device (n) 107(*n*). When the diagnostic apparatus 103 receives the one or more messages (data) from the one or more nautical electronic devices 107(*a*)-107(*n*), the diagnostic apparatus 103 parses the data and analyses the data accordingly. In other words, a device may send only the type of data it collects, and the diagnostic apparatus 103 is able to parse and analyse each message data block from each device accordingly. So, the diagnostic apparatus 103 is able to implement separate algorithm for each of the one or more nautical electronic devices 107 (*a*)-107 (*n*). The one or more nautical electronic devices 107(*a*)-107(*n*) may use National Marine Electronics Association (NMEA) 0183 standard for communication with the diagnostic apparatus 103. The one or more messages comprise an NMEA message. The NMEA message provides information associated with the failure of the device, such as name of the equipment under failure, alarm condition, alarm description, or the likes. The one or more nautical electronic devices 107(*a*)-107(*n*) may be sensors that are responsible for measuring different types of data from other devices.

FIG. 10 is a schematic diagram 1000 that exemplarily illustrates initialization procedure of the diagnostic apparatus 103, in accordance with an example embodiment. For the diagnostic apparatus 103 to parse the message based on the type of the message, the user can set the type of the message to be parsed through the UI provided by the DW Workbench 213. All message types are provided to the user in the form of a dropdown list. Additionally, the diagnostic apparatus 103 may connect to the network through a machine's network interface. The user, again through the UI, can set the network interface of the diagnostic apparatus 103, IP address and port number to listen to messages from the one or more devices. Thus, the initialization procedure comprises setting five parameters for the diagnostic apparatus 103. The five parameters, as illustrated in FIG. 10, are interface address (interface) 1001, message type 1003, UDP transmission 1005, group address 1007, and port number (port) 1009. The initialization procedure must be completed before deploying the diagnostic apparatus 103 for receiving the one or more messages from the one or more nautical electronic devices 107. Only after the completion of the initialization procedure the diagnostic apparatus 103 can communicate with the one or more nautical electronic devices 107.

The interface 1001 comprises an IP address that identifies the host (i.e., a diagnostic apparatus 103), or more specifically network interface of the host, and it provides the location of the host in the network, and thus the capability of establishing a connection to that host. The message type 1003 defines type of NMEA 0183 message. Defining NMEA 0183 message type enables the diagnostic apparatus-103 to monitor devices for particular events only. For example, by defining message type 1003 as ALR, allows the diagnostic apparatus 103 to determine only alarm type messages. Further, the UDP transmission 1005 is used to define message type. The diagnostic apparatus 103 on reception of the messages from the one or more nautical electronic devices 107 checks whether the type of the received message matches with the defined UDP transmission type. The diagnostic apparatus 103 continues to parse the received message only when the type of the received message matches with the UDP transmission message type. The group address 1007 is an IP multicast group address.

Further, the group address 1007 is used by the diagnostic apparatus 103 and the one or more nautical electronic devices 107 to send and receive multicast messages. The diagnostic apparatus 103 uses the group address 1007 as the IP destination address in its data packets. The one or more nautical electronic devices 107 use this group address 1007 to inform the network that they are interested in receiving packets from/sending packets to that group. Further, the port 1009 is a logical construct that identifies a specific process or a type of network service.

After the completion of the initialization procedure, the diagnostic apparatus 103 can receive the one or more messages from the one or more nautical electronic devices 107. Upon reception of a message, the diagnostic apparatus 103 parses the message based on a predefined structure. The predefined structure defines which part or block of the message comprises which information. This predefined structure is unique and does not change throughout the running process, which enable the diagnostic apparatus 103 to parse each message correctly. The predefined structure may be different for different types of messages. The different types of messages may be alert type message that alerts the diagnostic apparatus 103 about failure of the one or more electronic devices. Other types of messages may comprise property type message that provides data that is relevant to vessel voyage (e.g., GPS, Depth, Speed, or the likes). Further, the type of message may be a connected type of message that provides information whether the vessel 101a is connected or disconnected with the diagnostic centre 109.

In an example embodiment, when the user wants to monitor the vessel 101a for failure of the one or more nautical electronic devices 107 within the vessel 101a, the user sets the message type 1003 of the diagnostic apparatus 103 to "ALR" on the UI as illustrated in FIG. 10. The diagnostic apparatus 103 is triggered when a message is received from any of the one or more nautical electronic devices 107. The diagnostic apparatus 103 initially determines a type of IP service used to send the message. The type of IP service may be unicast or multicast. In order to determine the type of the IP service, the diagnostic apparatus 103 uses following set of rules:
1. Check beginning of the message
   a. If the message starts with '$' or'!' parse the message as using UNICAST IP service
   b. If the message starts with "UdPbC\0\s:" (where \0 is NULL) parse the message as using MULTICAST IP service.

If the message is using the UNICAST IP service, then the diagnostic apparatus 103 is configured to:
1. Find second '$' in message this indicates the start of the NMEA message to be read
2. Read the NMEA message to determine the type of message (from index 3-6 in the NMEA message)
3. Compare the type of message determined in step 1 with target message type (for example, "ALR")
   a. If matches continue, else ignore message and stop parse
3. Parse the NMEA message based on the type of the message If the message is using the MULTICAST IP service, then the diagnostic apparatus 103 is configured to:
1. Remove front ("UdPbC\0\s:") from the message
2. Scan the message for "\s:" to find end of first message
   a. If message is NULL, exit
   b. If no "\s:" is found there is only one message
3. Find device name and identity
   a. Read next 6 characters after "UdPbC\0\s" to find the device name and the identity
4. Find the NMEA message
   a. Find first '$' character that denotes start of the NMEA message
   b. Read the NMEA message to determine the type of message (from index 3-6 in the NMEA message)
   c. Compare the type of with the target message type (for example, "ALR")
   d. If matches continue parsing the NMEA message based on the type of the message, else ignore the message and stop parse
5. Move message pointer to end of the message (denoted by "\s:") and Repeat step 2.

Figure 11:
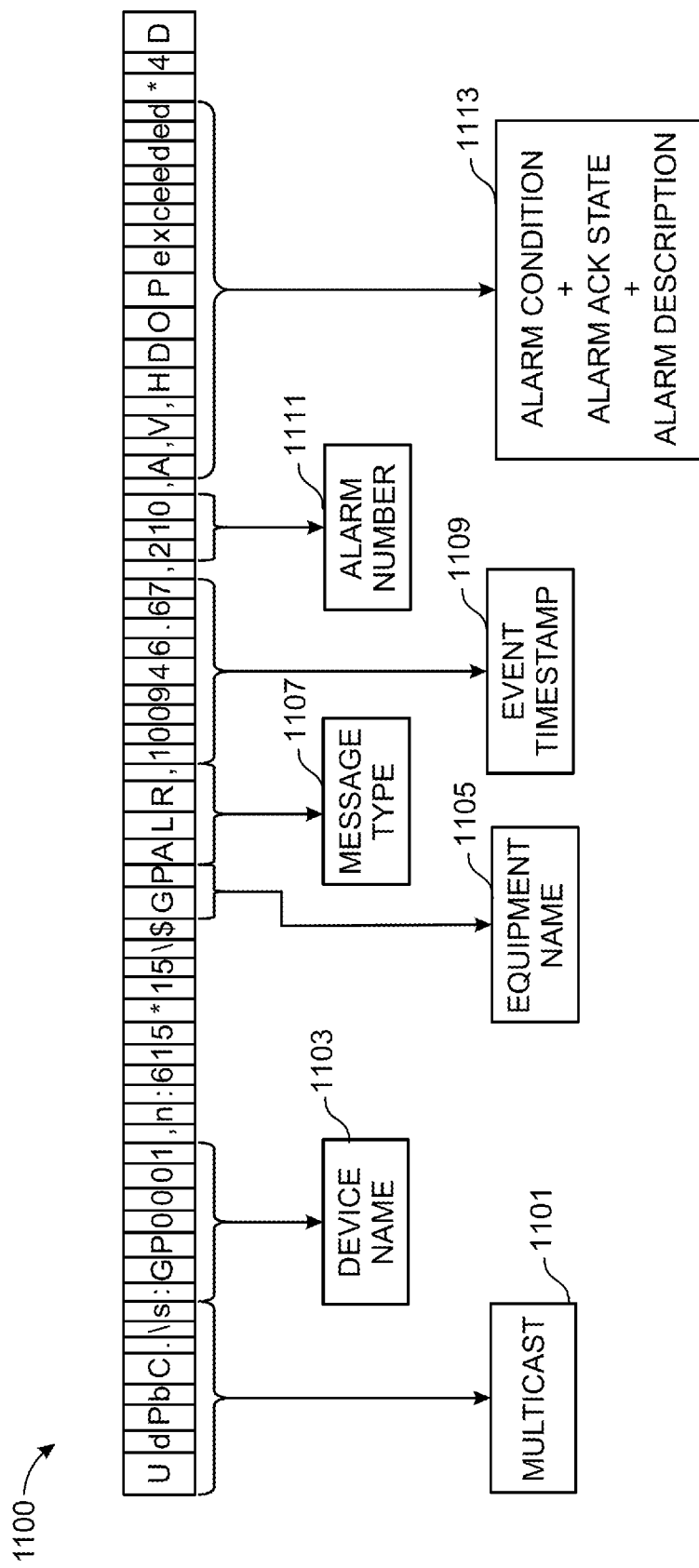
FIG. 11 illustrates an exemplary message received by the diagnostic apparatus from a device within the vessel, in accordance with an example embodiment.
Figure 12:
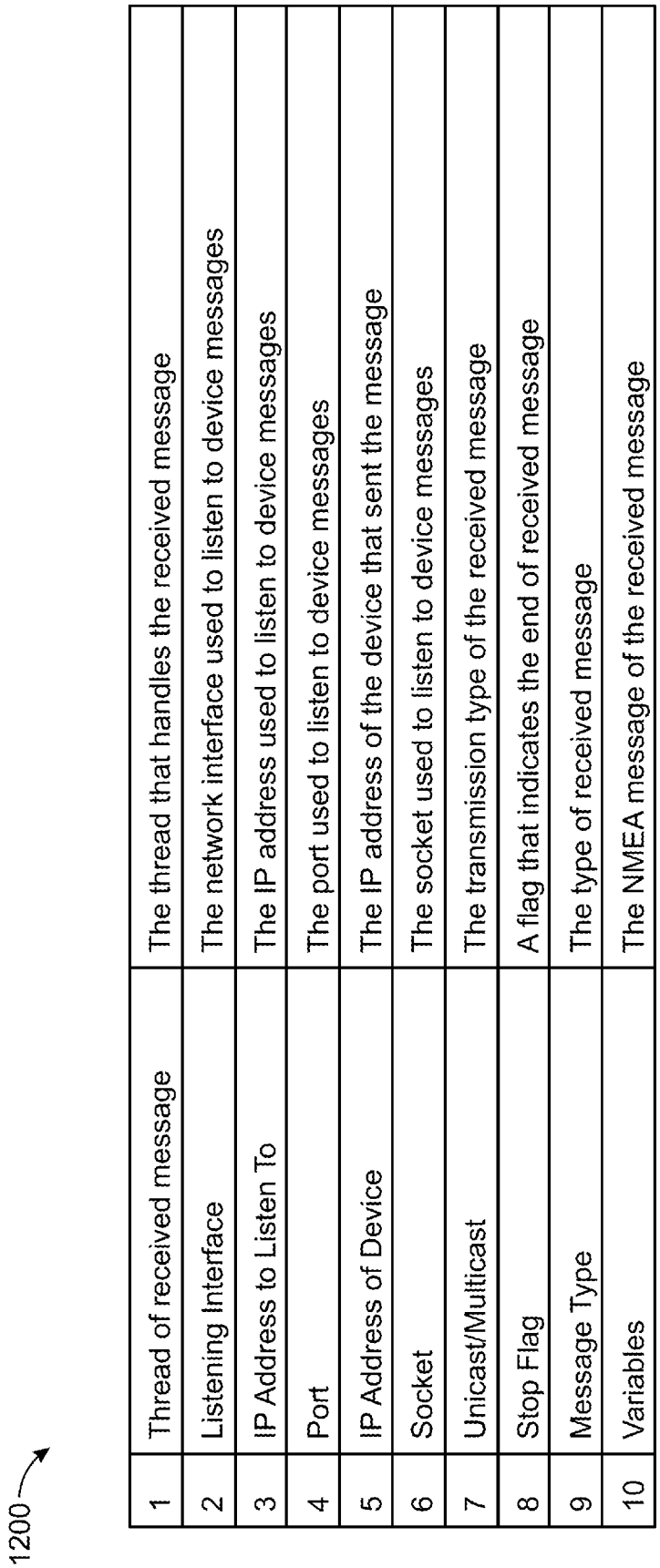
FIG. 12 illustrates a tabular representation of parameters to be processed and stored by the diagnostic apparatus 103 for every received message, in accordance with an example embodiment.

The rule set for parsing the NMEA message is as follows:
1. Check for '$' or'!' characters at start of the message
   a. If missing stop parsing
2. Find and save a checksum by searching for '*' character, the checksum is indicated by the two numbers following the '*', and replace '*' with NULL
3. Get talker. The talker is the device sending the one or more messages to diagnostic apparatus 103. Name of the device is determined by parsing two characters after '$' or'!', index 1 and 2 in the NMEA message
4. Go to start of parameters (index 6, after the '$' or'!' characters indicating the start of the NMEA message)
5. Read up to ',' or NULL
   a. If ',' is found save parameter and move onto next parameter by repeating step 4
   b. If NULL is found message has been parsed, exit In an example embodiment, the diagnostic apparatus 103 may be initialized to receive "ALR" type messages. FIG. 11 illustrates an exemplary message 1100 received by the diagnostic apparatus 103 from a nautical electronic device within the vessel 101a, in accordance with an example embodiment. Further, FIG. 12 illustrates a tabular representation 1200 of parameters to be processed and stored by the diagnostic apparatus 103 for every received message, in accordance with an example embodiment. At this stage, the diagnostic apparatus 103 already has set values for parameters 1 to 5, 7 and 9, of the table 1200, during the initialization process (parameters. 2, 3, 4, 7, 9), using the module's UI, or during run-time (parameters 1 and 6). Note that the module parses the message if the parameter no. 8 is not true.

The parsing of the NMEA message is exemplarily illustrated using the message illustrated in FIG. 11. The message 1100 contains a plurality of fields that illustrate the combined identification data and specification data. The identification data consists of information about the at least one message and identification of the nautical electronic device sending the message 1100, for example, transmission method such as MULTICAST 1101 of the message 1100, name of the nautical electronic device 1103, equipment name 1105, and message type 1107. The specification data consists of information about the state of the nautical electronic device, in terms of nautical electronic device's malfunctions or failures (alarms) or in terms of nautical electronic device's measurements or readings (properties), for example, the specification data may comprise an event time stamp 1109, an alarm number 1111, and alarm condition, alarm acknowledgment state, and alarm description 1113.

The message 1100 starts with the "UdPbC.\s:". The diagnostic apparatus 103 sets the parameter no. 7 to MULTICAST 1101. The next 6 characters after the "UdPbC.\s:" is the device name 1103 and identity of the device. According to the exemplary message 1100, the device name and its identity is "GP0001", where "GP" is the device name and "0001" is the identity. Next the diagnostic apparatus-103 searches the message 1100 for the start of the NMEA message. The start of the NMEA message is indicated by the "$". The first 2 characters after the "$" is the equipment name 1105. In the exemplary message 1100, the equipment name 1105 is "GP". The next 3 characters indicate the type 1107 of the NMEA message. In the illustrated example, the NMEA message type 1107 is "ALR". The main body of the NMEA message, i.e., the values of the alarm event itself, are included in the message after the first comma, and before the "*" at the end of the message. For example, next nine character after the message type 1107 field comprises alarm event timestamp 1109. All these values are comma-separated, starting with the time the event occurred, followed by the alarm number 1111, alarm condition, the alarm acknowledgement state, and then followed by an alarm description 1113. The one or more messages from the one or more nautical electronic devices 107 are thus parsed based on the predefined rules for parsing particular type of message.

In another embodiment, diagnostic apparatus 103 on reception of the i.e., ALR type message (as described above in FIG. 11 from the one or more nautical electronic devices 107, executes the first trigger and the second trigger. The first trigger is configured to operate constantly as a background process to receive one or more messages from the one or more nautical electronic devices 107, wherein each message from the one or more messages comprises an alarm state data, and wherein the first trigger is configured to process the message based on a comparison of a current alarm state to a previous alarm state using the alarm state data.

Further, the diagnostic apparatus 103 is configured to execute the second trigger. The second trigger is configured to operate at scheduled intervals of time to receive one or more messages from the one or more nautical electronic devices 107. The second trigger is configured to process the message to check whether there is a change in the alarm state data between a last scheduled timestamp and a current scheduled timestamp. The detecting module 307 is further configured to transmit the message with information associated with failure of the one or more nautical electronic devices 107 to the remote diagnostic center 109 based on the processing of the message by the first trigger and the second trigger.

To that end, the diagnostic apparatus 103 has access to the local database 207, and specifically has access to the three tables illustrated in FIG. 13, FIG. 14, and FIG. 15. These tables may be stored in the database 207. The three tables are: 1. Device Alarms States Table, 2. Alarm Key, and 3. Device Alarm State Request.

FIG. 13 is a tabular representation 1300 of the Device Alarms States, in accordance with an example embodiment. In FIG. 13, the device alarm state table 1300 comprises information associated with the one or more nautical electronic devices 107, and current state and previous state of the alarms received by the diagnostic apparatus 103. For example, field 1301 corresponds to a device field that comprises names of the one or more nautical electronic devices. Field 1303 corresponds to alarm number that comprises unique number specific for each alarm, field 1305 corresponds to alarm acknowledgement state (Alarm ACK state) that comprises a single-letter value that indicates whether the alarm is acknowledged or not by a user, field 1307 corresponds to last alarm condition that comprises information whether the alarm condition was taken during the last request, field 1309 corresponds to timestamp that comprises a timestamp of the occurred alarm event handled by the diagnostic apparatus 103, field 1311 corresponds to last changed timestamp that comprises a timestamp associated with last event alarm state change occurred, field 1313 corresponds to log field that comprises a three-letter value that indicates the message type, field 1315 corresponds to description field that comprises the description of the alarm, field 1317 corresponds to equipment name that comprises a two-letter word that defines the equipment type (for example, the equipment name RA may define RADAR), and field 1319 corresponds to source internet protocol (IP) that comprises IP address of the one or more nautical electronic devices.

FIG. 14 is a tabular representation 1400 of the Alarm Keys, in accordance with an example embodiment. In FIG. 14, the Alarm Keys table 1400 is used to map each alarm number with specific alarm key. The table 1400 has three fields namely: equipment field 1401 that comprises a two-letter word that defines the type of equipment, an alarm number field 1403 that comprises a unique number specific for each alarm, and an alarm key field 1403 that comprises a word that describes an alarm key which is unique of each type of alarm, as shown in the table 1400.

FIG. 15 is a tabular representation 1500 of the Device Alarm State Requests, in accordance with an example embodiment. In FIG. 15, the Device Alarm State Request table 1500 comprises last request field 1501 that comprises a timestamp of the last time the scheduled request for alarm states was run.

Figure 16:
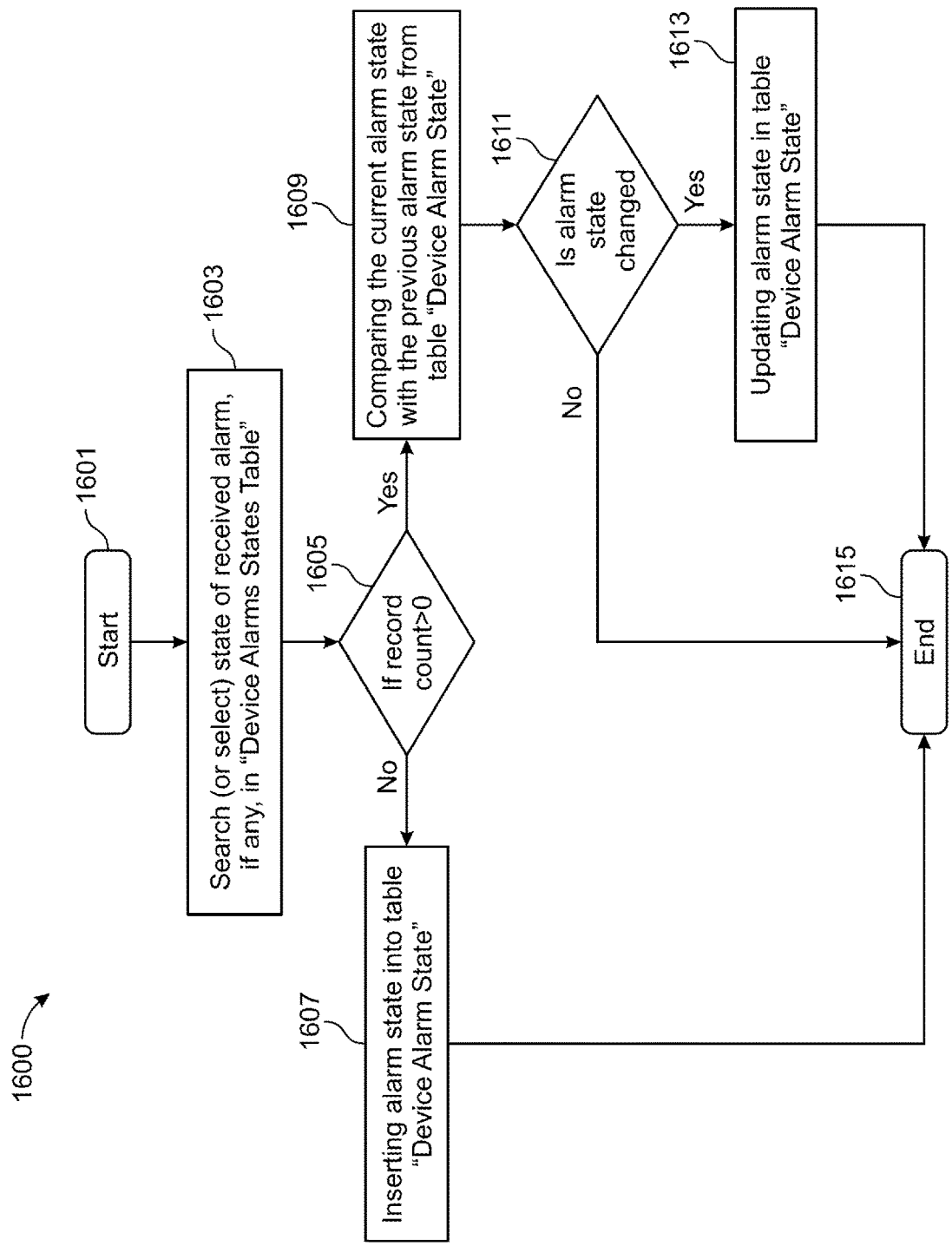
FIG. 16 is a flowchart that illustrates steps of a method executed by the first trigger, in accordance with an example embodiment.

FIG. 16 is a flowchart that illustrates steps of a method 1600 executed by the first trigger, in accordance with an example embodiment. The diagnostic apparatus 103 executes the first trigger continuously as a background process to determine reception of one or more alert messages. When the diagnostic apparatus 103 receives the one or more alert messages, at step 1601, the diagnostic apparatus 103 may be triggered to execute the first trigger. At step 1603, state of alarms received, if any, may be searched (or selected) from the Device Alarms States Table 1300. These records are associated with the alarms received from the devices and stored into the database 207. At step 1605, based on the reading; it may be determined whether the received alert message is a first time when the alert type of message corresponding to the one or more nautical electronic devices 107 is received by the diagnostic apparatus 103. To that end, the diagnostic apparatus checks a number of alarm states records corresponding to the one or more nautical electronic devices 107 in the Device Alarm State table 1300. When the number of alarm state records is zero (i.e., there are no records of the alarm states corresponding to the one or more devices), the diagnostic apparatus 103 determines that the received alert message is the first time when the alert type of message corresponding to the one or more nautical electronic devices 107 is received. In this case, the method proceeds to step 1607. At step 1607, new alarm state corresponding to the one or more nautical electronic devices 107 may be inserted into the Device Alarm State table 1300, and the method ends at step 1615.

On the other hand, when the number of alarm state is greater than zero, the diagnostic apparatus 103 determines that there have been alert type messages corresponding to the one or more devices previously (or at a previous timestamp). In this case, the method 1600 proceeds to step 1609. At step 1609, the current alarm states may be compared with the previous alarm states from the Device Alarm State table. Further, at step 1611, it may be determined whether the one or more alarm states corresponding to the one or more nautical electronic devices 107 has changed. When it is determined that the one or more alarm states are not changed the process ends at 1615. On the other hand, when it is determined that the one or more alarm states are changed, then at step 1613, the one or more alarm states in the Device Alarm State table 1300 may be updated, and the method ends at step 1615. In some embodiments, on determining that the one or more alarm state corresponding to the one or more nautical electronic devices 107 are changed from OFF to ON (i.e., the failure is detected) then failure detection information associated with the failure of the one or more nautical electronic devices 107 may be transmitted to the remote diagnostic centre 109. On the other hand, on determining that the one or more alarm state corresponding to the one or more nautical electronic devices 107 are changed from ON to OFF (i.e., the failure is resolved) then information associated with troubleshooting of the one or more nautical electronic devices 107 may be transmitted to the remote diagnostic centre 109.

Figure 17:
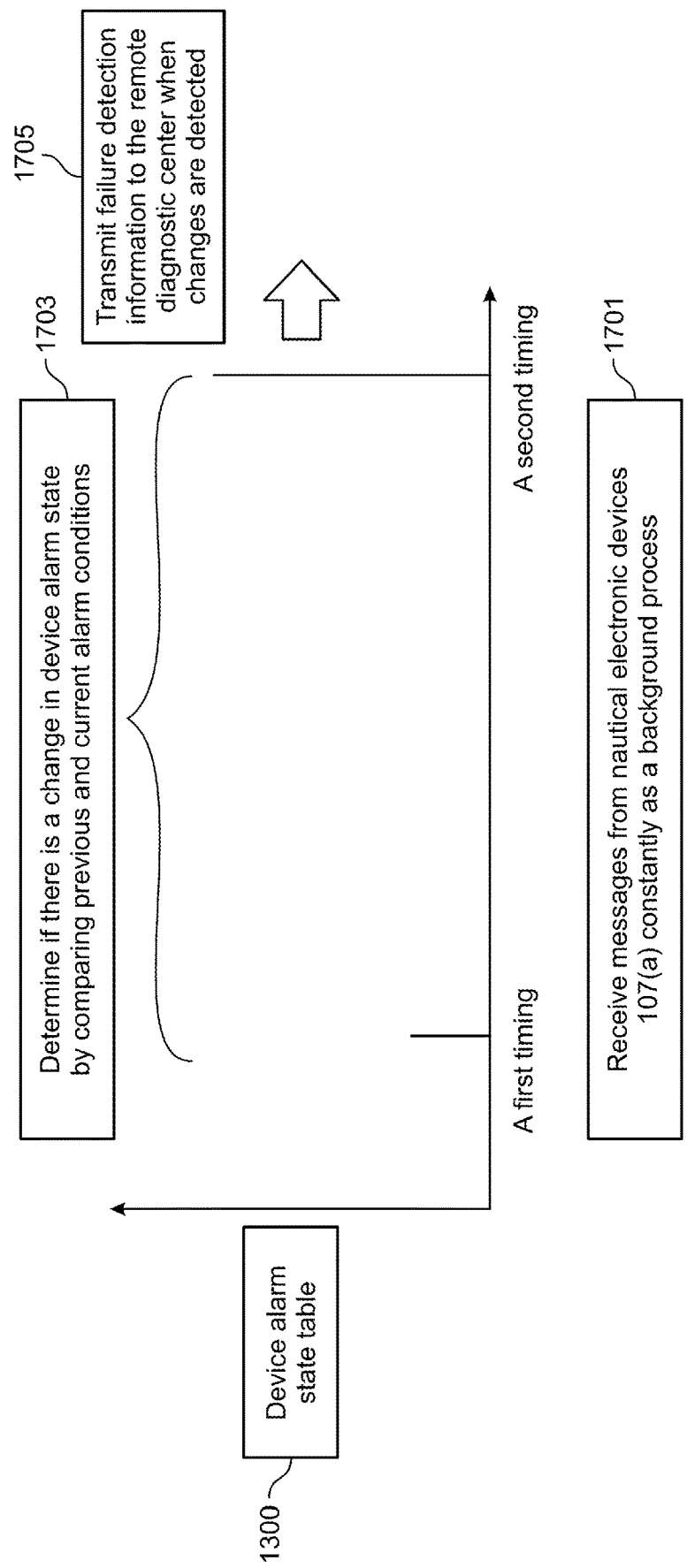
FIG. 17 is a schematic diagram that illustrates execution of the first trigger process, in accordance with an example embodiment.

FIG. 17 is a schematic diagram 1700 that illustrates execution of the first trigger process, in accordance with an example embodiment. The first trigger process is executed constantly as the background process. On reception 1701 of a message from the nautical electronic device 107(a) indicative of failure of the nautical electronic device 107(a), the diagnostic apparatus 103 searches for state of alarm corresponding to the nautical electronic device 107(a) in the Device Alarm State table 1300 to determine 1703 whether there is a change in a current alarm state of the nautical electronic device 107(a) received in the message and a previous alarm state of the nautical electronic device 107(a) stored in the device alarm state table 1300. To that end, the previous alarm state, at a first timing of the nautical electronic device 107(a) is compared with the current alarm state, at a second timing of the nautical electronic device 107(a). If it is determined that the alarm state is changed, a failure detection information is transmitted to the remote diagnostic centre 109, where the failure detection information comprises, information associated with the failure of the nautical electronic device 107(a) and identification data identifying the nautical electronic device 107(a).

Figure 18:
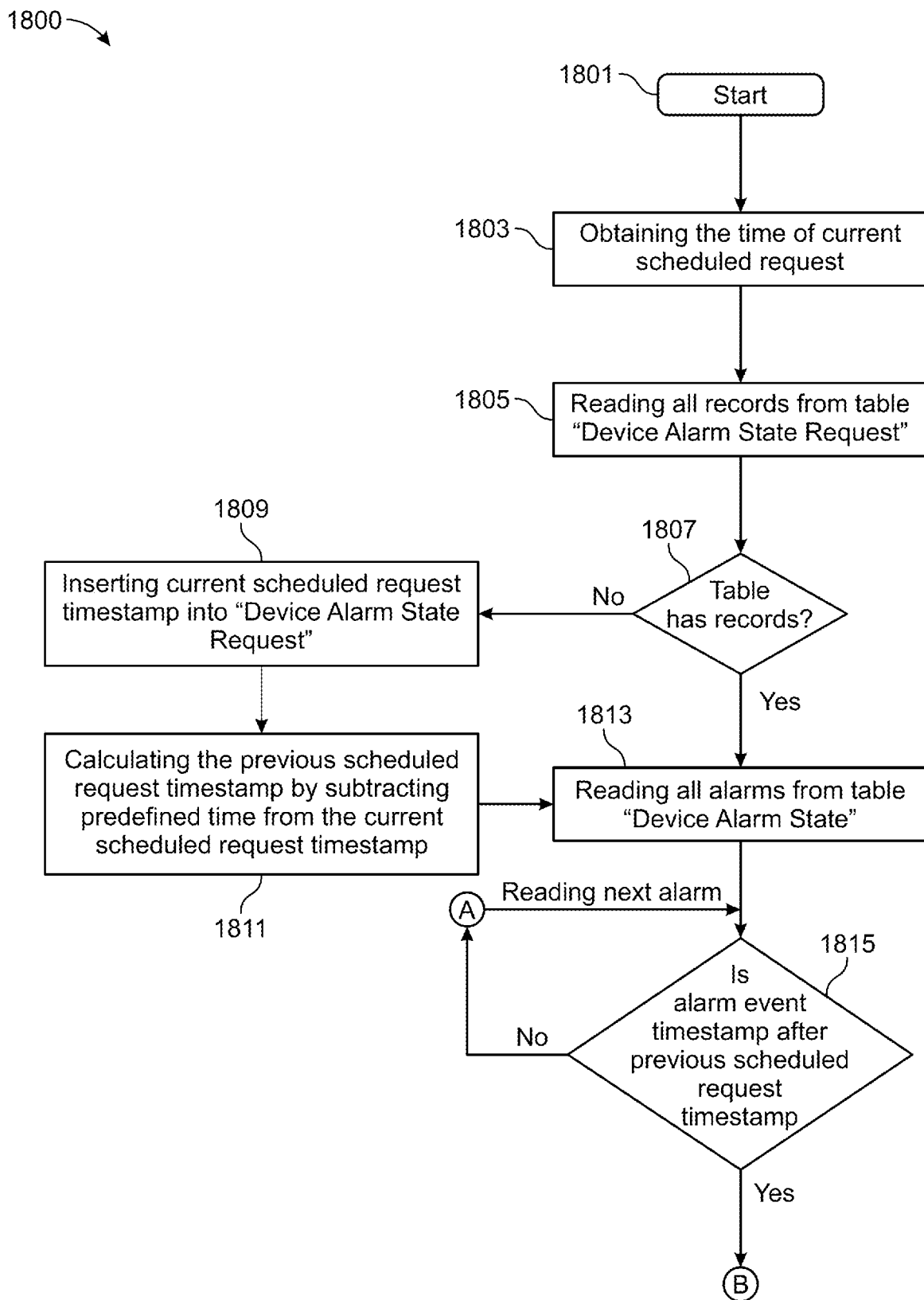
FIG. 18 is a flowchart that illustrates steps of a method executed by the second trigger, in accordance with an example embodiment.
Figure 18:
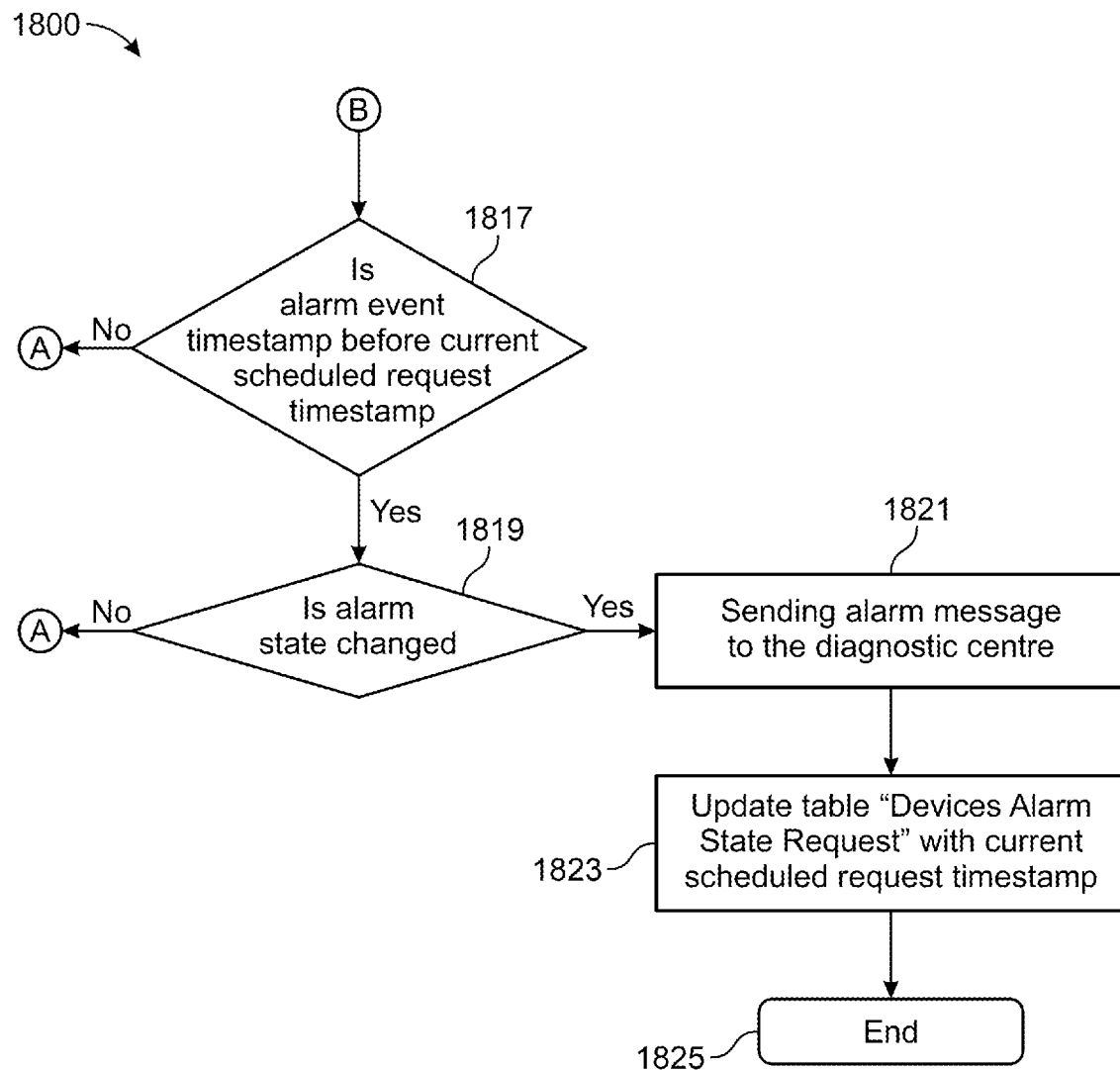

FIG. 18 is a flowchart that illustrates steps of a method 1800 executed by the second trigger, in accordance with an example embodiment. The second trigger is configured to operate at scheduled intervals of time to receive one or more messages from the one or more nautical electronic devices 107. The second trigger is configured to process the message to check whether there is a change in the alarm state data between a last scheduled timestamp and a current scheduled timestamp. Based on the processing of the message by the second trigger, the detecting module 307 is further configured to transmit the message with information associated with failure of the nautical electronic device 107 to the remote diagnostic center 109. To that end, at step 1801, the second trigger starts executing.

At step 1803, the time of current scheduled request may be obtained. At step 1805, all records from the Device Alarm State Request table 1500 may be read to determine the last time the scheduled request for the second trigger was executed. At step 1807, it may be determined whether the received scheduled request is a first time when the scheduled request is received by the diagnostic apparatus 103, by checking whether there exist any records in the Device Alarm State Request table 1500. When the number of the scheduled request is zero, the diagnostic apparatus 103 determines that the received scheduled request is the first time when the scheduled request is received. In this case, the method proceeds to step 1809.

At step 1809, the current scheduled request timestamp may be inserted into the Device Alarm State Request table 1400. Further, at step 1811, the previous scheduled request timestamp may be calculated by subtracting predefined time from the current scheduled request timestamp, and then the method proceeds to step 1813. On the other hand, when the number of the scheduled requests in non-zero that is to say, the current scheduled request is not the first scheduled request then the method directly proceeds to step 1813. At step 1813, all alarms from the table Device Alarm State table may be read.

At step 1815, it may be determined whether the alarm event timestamp is after the previous scheduled request timestamp. When the diagnostic apparatus 103, determines that the alarm event timestamp is not after the previous scheduled request timestamp (i.e., before the previous scheduled request timestamp), the method 1800 may continue to read the next alarm event (A in flowchart). On the other hand, when the diagnostic apparatus 103, determines that the alarm event timestamp is after the previous scheduled request timestamp, the method 1800 continues to step 1817 (B in flowchart). At step 1817, it is determined whether the alarm event timestamp is before current scheduled request timestamp. When the diagnostic apparatus 103, determines that the alarm event timestamp is not before the current scheduled request timestamp, the method 1800 continues to read (A) the next alarm event. On the other hand, when the diagnostic apparatus 103, determines that the alarm event timestamp is before the current scheduled request timestamp, the method continues to step 1819.

At step 1819, it may be determined whether the alarm state has changed. When the diagnostic apparatus 103 determines that the alarm state has not changed, the method 1800 continues to reading the next alarm event. On the other hand, when the diagnostic apparatus 103 determines that the alarm state has changed, the method 1800 proceeds to step 1821. At step 1821, the alarm message may be sent to the remote diagnostic centre 109. At step 1823, the Device Alarm State Request table may be updated with current scheduled request timestamp, and the method ends at step 1825. In some embodiments, on determining that the one or more alarm state corresponding to the one or more nautical electronic devices 107 are changed from OFF to ON (i.e., the failure is detected) then failure detection information associated with the failure of the one or more nautical electronic devices 107 may be transmitted to the remote diagnostic centre 109. On the other hand, on determining that the one or more alarm state corresponding to the one or more nautical electronic devices 107 are changed from ON to OFF (i.e., the failure is resolved) then information associated with troubleshooting of the one or more nautical electronic devices 107 may be transmitted to the remote diagnostic centre 109.

Figure 19:
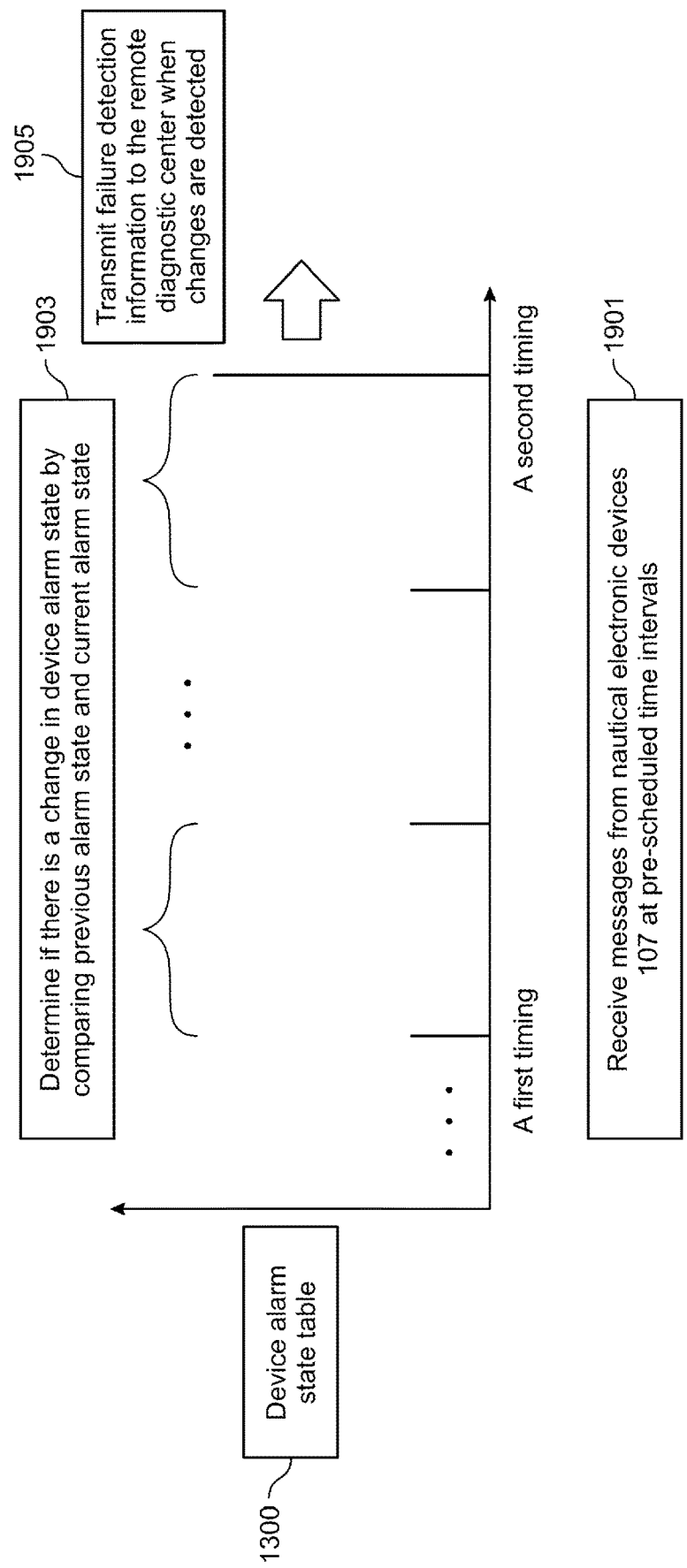
FIG. 19 is a schematic diagram that illustrates execution of the second trigger process, in accordance with an example embodiment.

FIG. 19 is a schematic diagram 1900 that illustrates execution of the second trigger process, in accordance with an example embodiment. receipt of a message and transmission of an alarm condition executed by a first trigger. The second trigger process is executed only at a scheduled time interval for receiving 1901 a message from one or more nautical electronics devices 107, for example, the nautical electronics devices 107(*a*). On reception 1901 of the message from the nautical electronic device 107(*a*) that is indicative of failure of the nautical electronic device 107(*a*), the diagnostic apparatus 103 searches for state of alarm corresponding to the nautical electronic device 107(*a*) in the Device Alarm State table 1300 to determine 1903 whether there is a change in a current alarm state of the nautical electronic device 107(*a*) received in the message and a previous alarm state of the nautical electronic device 107(*a*) stored in the device alarm state table 1300. To that end, the previous alarm state, at a previous (most recent) scheduled timestamp, of the nautical electronic device 107(*a*) is compared with the current alarm state, at current scheduled timestamp, of the nautical electronic device 107(*a*). If it is determined that the alarm state is changed, a failure detection information is transmitted 1905 to the remote diagnostic centre 109, where the failure detection information comprises comprising information associated with the failure of the nautical electronic device 107(*a*) and identification data identifying the nautical electronic device 107(*a*).

FIG. 20 shows an exemplary Device Alarm State Table 1400 used by the second trigger process to determine alarm condition, in accordance with an example embodiment. Considering device alarm states of the device EI0001 as shown by 2001 in FIG. 20 the second trigger process determines that for alarm no. 380 of the device EI0001 the current alarm condition is V (OFF), Timestamp: 2020-02-27 11:37:01.974. But for the same alarm No. 380 Last alarm Condition is A (ON), as the alarm condition was acknowledged at Last Changed Timestamp: 2020-02-27 11:36: 58.000. The second trigger process further checks if the current alarm condition is between the previous and current scheduled time stamp to publish an alarm. If this is true, the second trigger process checks if the alarm condition state changed between this period. If YES, the second trigger process publishes the alarms and sets the Last Alarm Condition field to A (ON).

FIG. 21 shows an exemplary table 2100 that illustrates working of the second trigger for alarm state changes in 20 minutes, in accordance with an example embodiment. In the exemplary scenario, the second trigger is assumed to have schedule interval of 5 minutes. Therefore, the second trigger checks for alarm state change between a current alarm state and the previous alarm state, of a particular device after every 5 minutes. As can be observed from the table, for a first timestamp interval between 0 minute to 5 minutes, current alarm state is 1 (i.e., the alarm state corresponding to a particular device is set or ON) and the previous (or last) alarm state is 0 (i.e., the alarm state corresponding to the particular device was previously OFF). The second trigger at the end of 5 minutes determines change in the alarm state and further determines that the current alarm state is 1, therefore it sets the last alarm condition to 1 and further publishes the alarm to the remote diagnostic centre 109.

At a second timestamp interval between 5-7 minutes, there is a change in the alarm state, however this alarm state change is before the next scheduled interval of the second trigger. Therefore, the diagnostic apparatus 103 waits for the next scheduled interval, which will start at 10 minutes. At a third timestamp interval between 7-10 minutes, the current alarm state is 1 and the previous alarm state is 0. The second trigger, at the end of 10 minutes, determines that there is a change in the alarm states and that the current state is 1. Therefore, the second trigger set the last alarm condition to 1 and publishes the alarm.

At a fourth timestamp interval between 10-15 minutes, there is no change in the current alarm state and the previous alarm state, therefore the second trigger does not publish the alarm condition. Further, at a fifth timestamp interval between 15-20 minutes, the current alarm state is 0 and the previous alarm state is 1. In this case, the second trigger at the end of 20 minutes determines that the current alarm state is 0 i.e., OFF, therefore, it publishes the alert condition.

Figure 22:
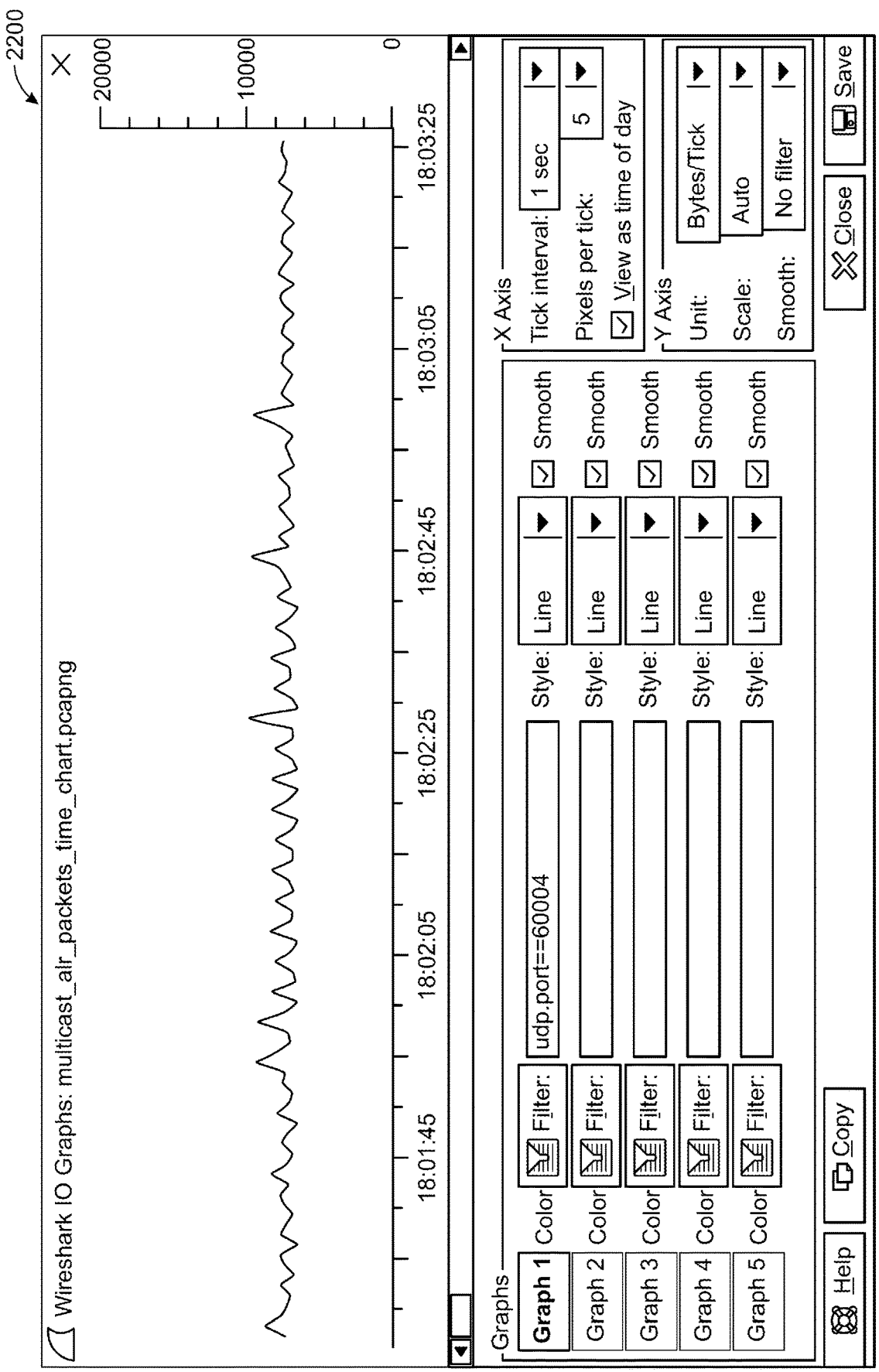
FIG. 22 shows an exemplary captured time chart when data from the one or more nautical electronic devices is received by the diagnostic apparatus, according to an example embodiment.

FIG. 22 shows an exemplary captured time chart 2200 when data from the one or more nautical devices 107 is received by the diagnostic apparatus 103, according to an example embodiment. The diagnostic apparatus 103 is initialized as explained earlier with respect to FIG. 10 in order to receive data from the one or more electronic devices. The figure illustrates number of bytes of data (on Y axis) received for a time interval (on X axis). In this exemplary scenario, data from only three nautical electronic devices is considered to be received at UDP port number 60004. As can be observed from the time chart, the average transition bytes coming from only three devices were almost 9K bytes over a 1-sec interval.

FIG. 23 shows an exemplary table 2300 comprising data processed by the triggers and recorded to the local database 207, according to an example embodiment. As can be observed from the figure, the diagnostic apparatus 103 records 26 rows of ALR logs into the device state table stored in the database 207. The device state table stores information such as alarm number, alarm condition, alarm acknowledgement state, last alarm condition, timestamp, last changed timestamp, log, description, and the likes.

Figure 24:
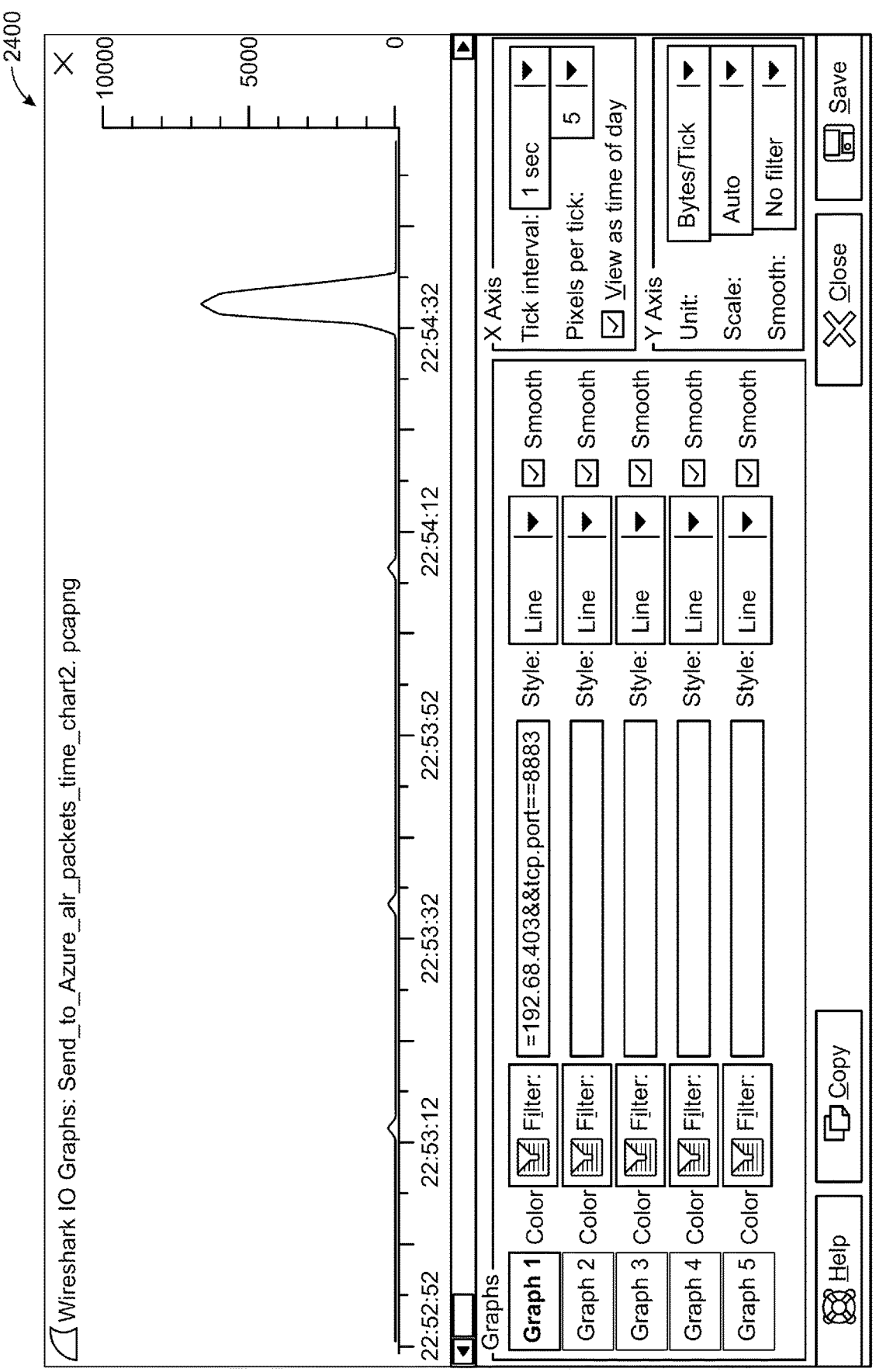
FIG. 24 shows an exemplary captured time chart when the diagnostic apparatus publishes data to the remote diagnostic centre, according to an example embodiment.

FIG. 24 shows an exemplary captured time chart 2400 when the diagnostic apparatus 103 publishes data to the remote diagnostic centre 109, according to an example embodiment. As can be observed from the figures the necessary information is finally published only one time when a state changed occurred within the previous and current scheduled timestamp.

Figure 25:
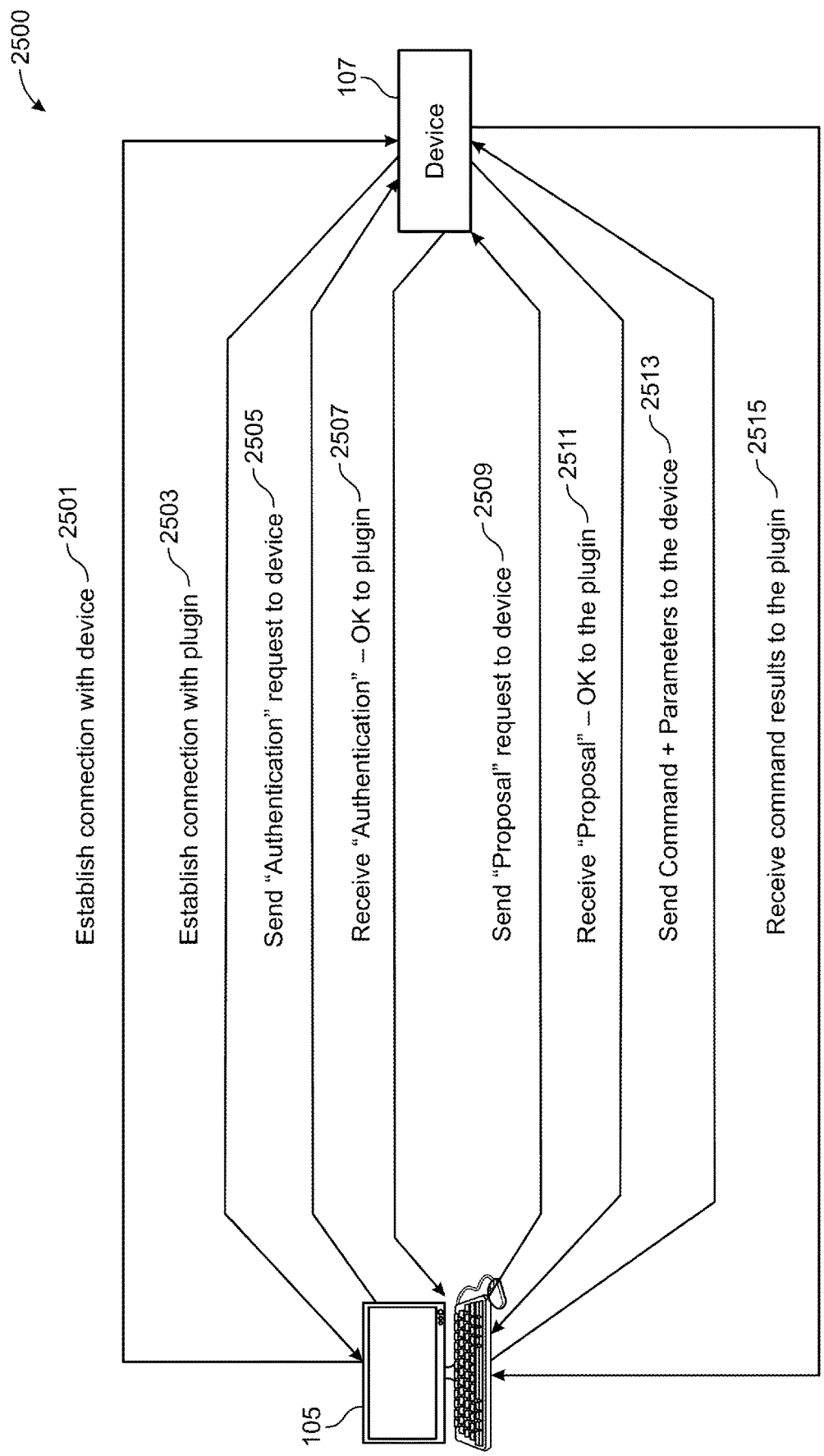
FIG. 25 illustrates an exemplary call flow of the initialization procedure, in accordance with an example embodiment.

FIG. 25 illustrates an exemplary call flow of the initialization procedure 2500, in accordance with an example embodiment. The initialization procedure 2500 comprises following steps: socket creation, authentication, proposal, and command transmission. At step 2501, a connection with the one or more devices may be established. Socket creation creates a socket that is used for communication between the plugins and the one or more devices. To that end, the plugins are provided with internet protocol (IP) addresses and port numbers, associated with the one or more devices. The IP addresses and the port numbers may be predefined for the plugins. In another embodiment, the user provides the IP addresses and the port numbers in real-time through a graphical user interface (GUI) of DW Workbench 213. To create a socket, at step 2501, a request for connection establishment with a device may be sent by the plugins. At step 2503, acknowledgement for the connection request from the device may be received by the plugins, and the socket is created.

The next step after a successful creation of the socket is the authentication step. During authentication, at step 2505, a username and a password in "authentication" request may be sent by the plugins to the one or more nautical electronic devices 107. If these two values are correct, then at step 2507, acknowledgement in "authentication—ok" message may be received by the plugins. On successful authentication, the next step is executed, otherwise the one or more devices "drop" the connection.

The username and password may be predefined statically inside the programming code of the plugin. In another embodiment, the user provides these two values in real-time through a graphical user interface (GUI) of DW Workbench 213. The next step after a successful authentication is the proposal (or negotiation) step. During proposal, the plugins decide whether to use encryption or not. In case the plugins determine to use the encryption, the plugins further determine which type of encryption is to be used for communication with the one or more devices. At step 2509, during proposal the determined encryption to be used for communication with the device may be sent by the plugins. Further, if the device supports the encryption, at step 2511, an acknowledgement in "proposal-ok" message from the nautical electronic device 107 may be received by the plugins.

In the next step 2513, the command number of the actions to be executed on the one or more nautical electronic devices 107 may be sent by the plugin to the one or more devices 107. As can be observed from the FIG. 25, one or more commands may be sent by the plugins to the one or more devices, and at step 2515, responses corresponding to the one or more commands may be received by the plugins. A detailed description of each command is described below with reference to FIGS. 26-30.

FIG. 26 shows an exemplary table 2600 that illustrates commands associated with the plugins along with their corresponding command numbers and description, in accordance with an example embodiment. The command numbers corresponding to each command is predefined and is provided to the plugins and the one or more nautical electronic devices 107. Based on the command number received, the one or more nautical electronic devices 107 send different results. FIGS. 27-30 illustrate detailed diagrams of usage of each command, in accordance with some embodiments.

Figure 27:
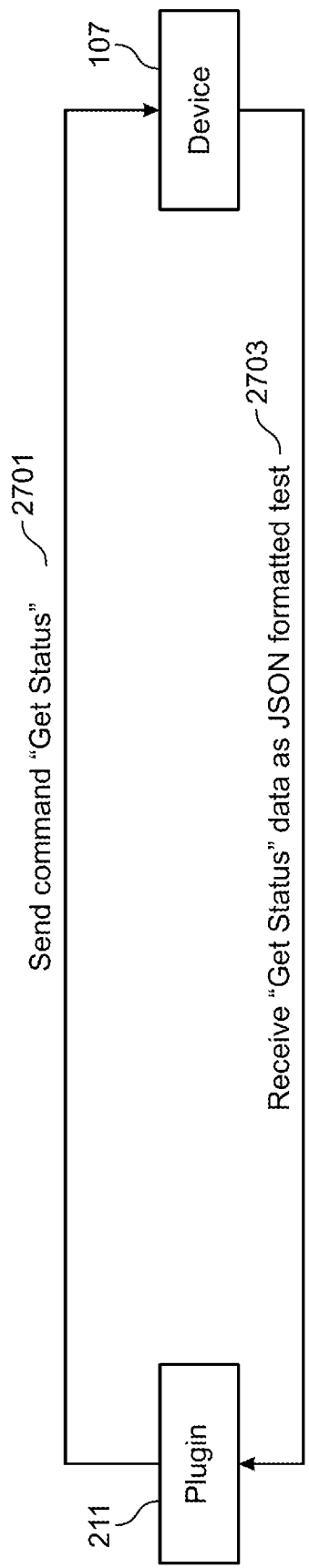
FIG. 27 illustrates steps of execution of get status command, in accordance with an example embodiment.

FIG. 27 illustrates steps of execution of get status command, in accordance with an example embodiment. At step 2701, a command Get Status may be sent by the plugin 211 to the one or more nautical electronic devices 107. The Get Status command is used to obtain statuses of the one or more nautical electronic devices 107. The one or more nautical electronic devices 107 on reception of the command determine the command number corresponding to the command Get Status, and at step 2703, statuses of the one or more nautical electronic devices 107 may be received by the plugin 211. The statuses of the one or more nautical electronic devices 107 may be in JavaScript object notation (JSON) formatted strings.

Figure 28:
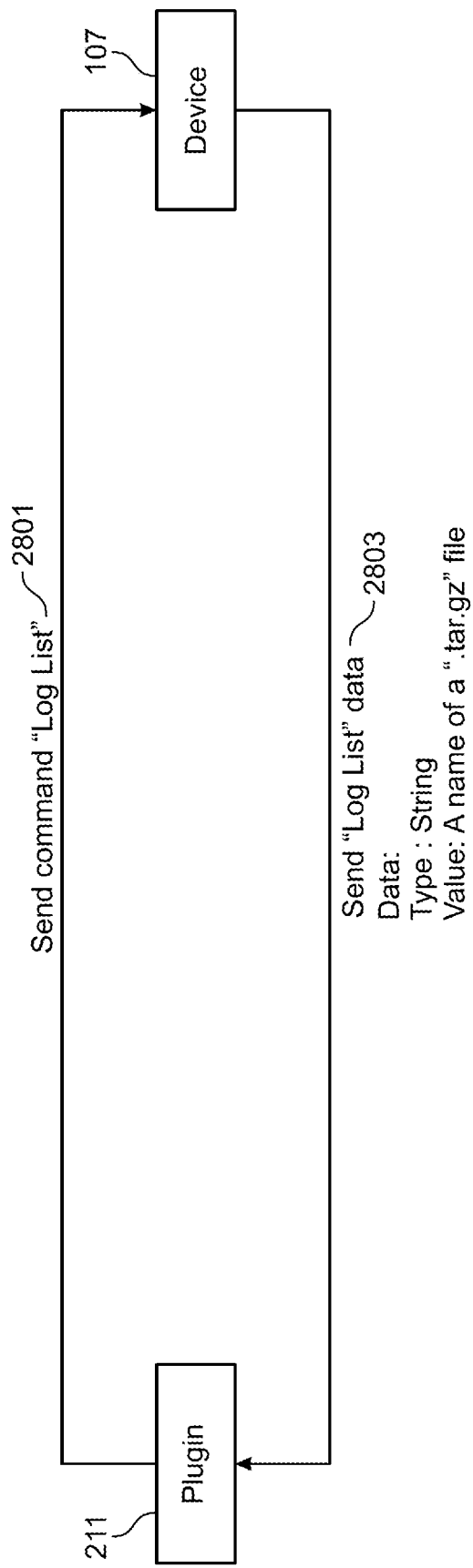
FIG. 28 illustrates steps of execution of log list command, in accordance with an example embodiment.

FIG. 28 illustrates steps of execution of log list command, in accordance with an example embodiment. At step 2801, Log List command may be sent by the plugin 211 to the nautical electronic device 107, in order to obtain logs associated with the nautical electronic device 107. In response, at step 2803, Log List data from the nautical electronic device 107 may be received by the plugin 211. The Log List data comprises a name of a tar.gz file. This file may be used as a parameter for a Data Downloading command because this file will contain the logs associated with the one or more nautical electronic devices 107.

Figure 29:
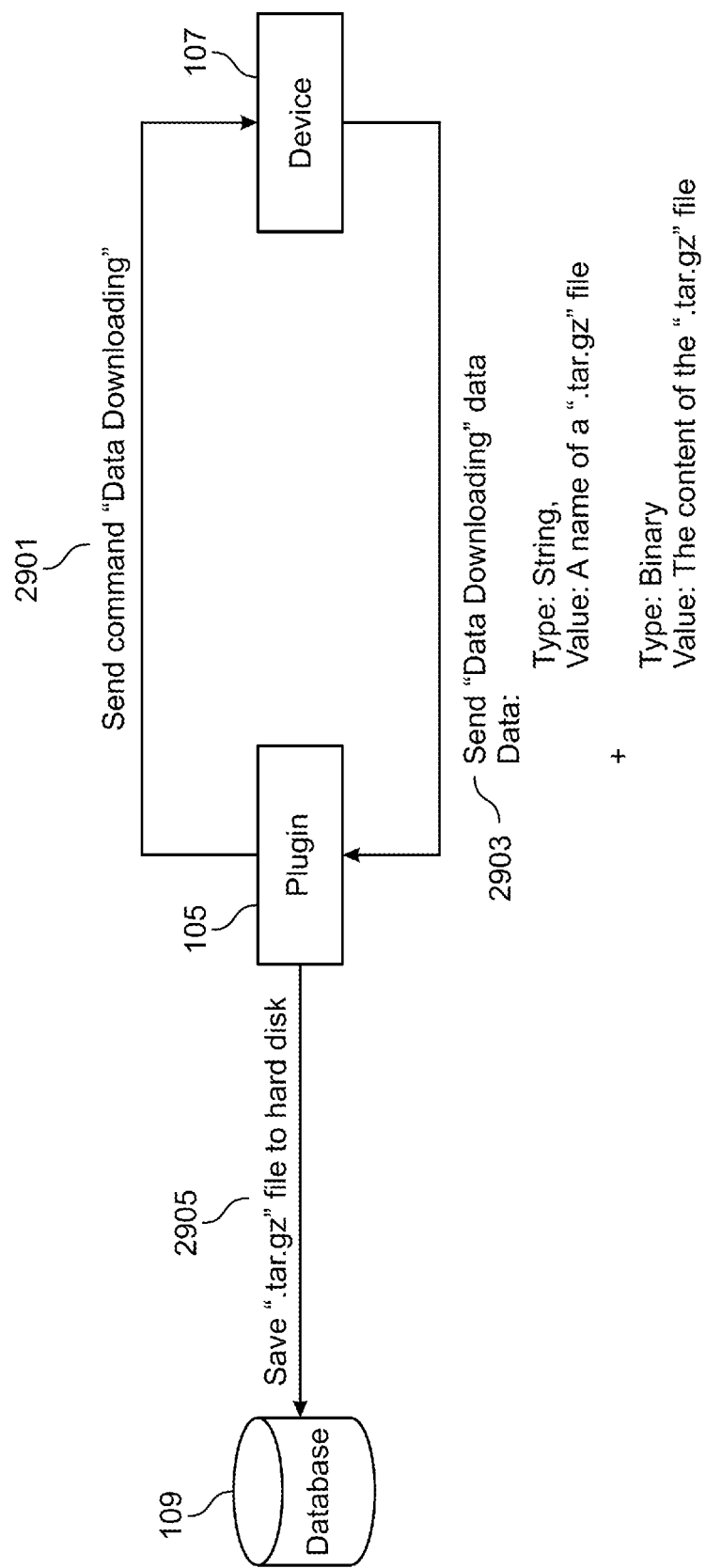
FIG. 29 illustrates steps of execution of data downloading command, in accordance with an example embodiment.

FIG. 29 illustrates steps of execution of data downloading command, in accordance with an example embodiment. The plugin 211 sends the Data Downloading command to the one or more devices. The Data Downloading command is used to perform the Log List command on the one or more devices. Further, the Data Downloading command stores the tar.gz file that contains the logs associated with the one or more devices into the database 207. As can be observed from the FIG. 30, at step 2901, the Data Downloading command may be sent by the plugin 211 to the nautical electronic device 107. In response, at step 2903, Data Downloading data which comprises a name of tar.gz file and contents of the tar.gz file may be received by the plugin 211. Further, at step 2905, the tar.gz file on the hard disk may be saved by the plugin 211.

Figure 30:
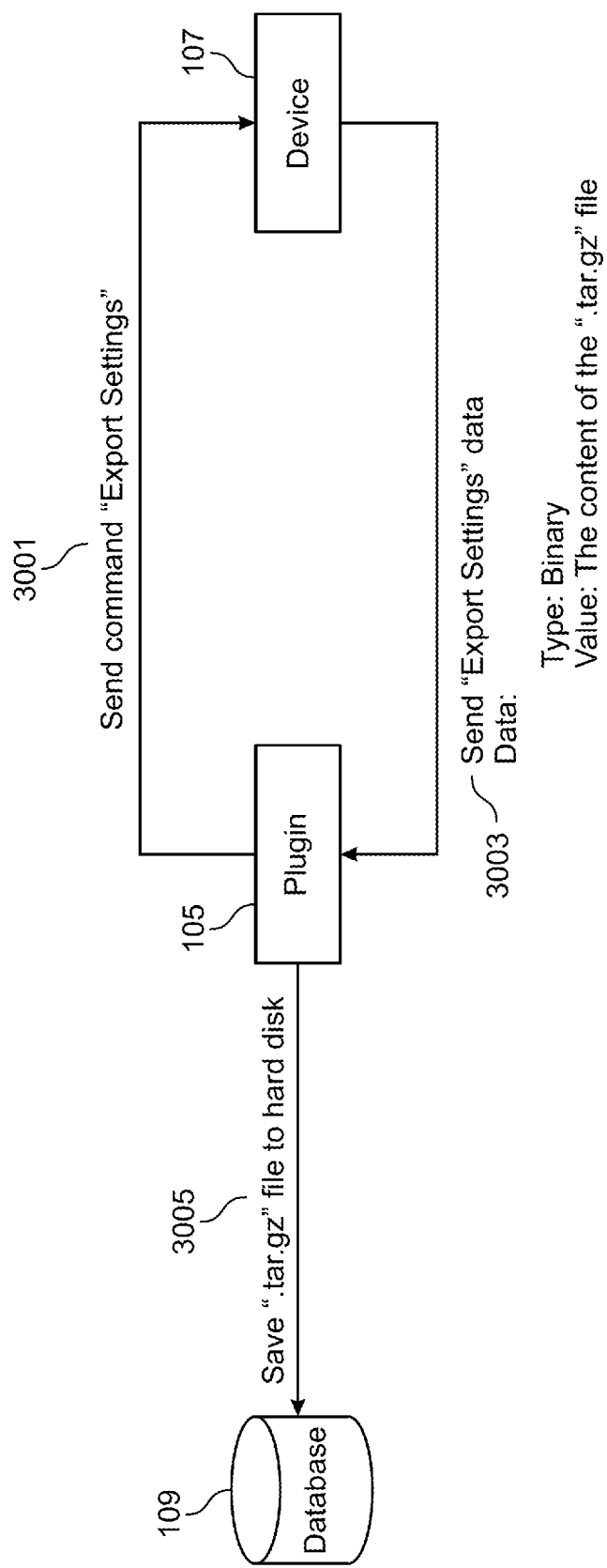
FIG. 30 illustrates steps of execution of export setting command, in accordance with an example embodiment.

FIG. 30 illustrates steps of execution of export setting command, in accordance with an example embodiment. The Export Settings command is used to obtain settings associated with the one or more nautical electronic devices 107 and store the settings. At step 3001, the Export Settings command may be sent by the plugin 211 to the nautical electronic device 107. In response, at step 3003, Export Settings data associated with the nautical electronic device 107 may be received by the plugin 211. The data comprise another tar.gz file that contains settings information associated with the nautical electronic device 107. Further, at step 3005, the tar.gz file may be saved by the plugin 211 to the hard disk.

Figure 31:
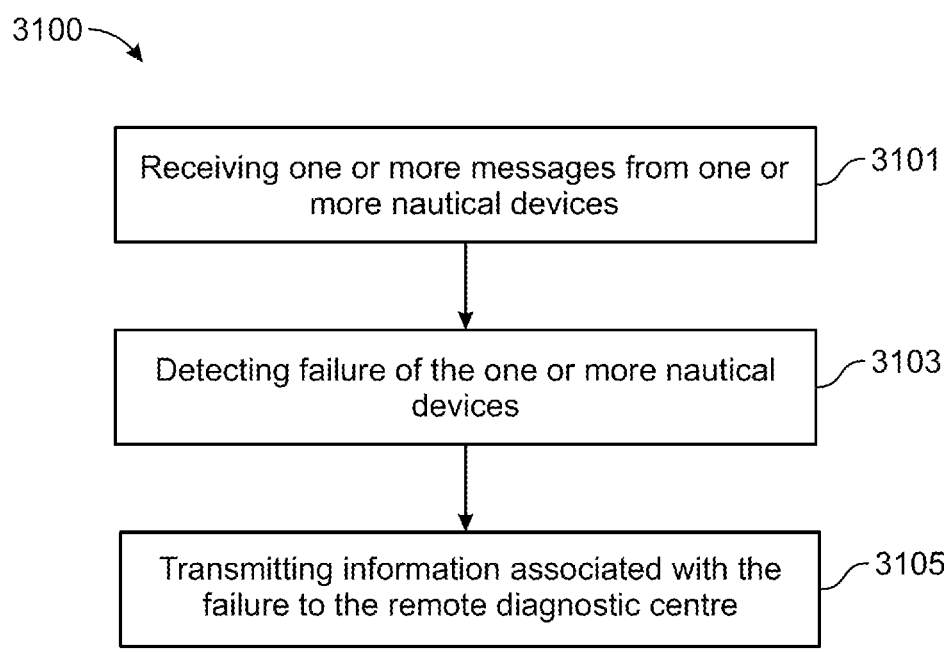
FIG. 31 is a schematic that illustrates steps of a method for remote monitoring of a vessel, in accordance with an example embodiment.

FIG. 31 is a schematic that illustrates steps of a method 3100 for remote monitoring of a vessel, in accordance with an example embodiment. At step 3101, one or more messages from the one or more nautical devices 107 may be received by the diagnostic apparatus 103. Each message comprises a combined identification data and a specification data for communication between the one or more nautical electronic devices 107 on the vessel 101a. Further, each message comprises NMEA 0183 message that may indicate failure of the one or more nautical electronic devices 107 on board the vessel 101a. Further, each message may be parsed to obtain the combined identification data and the specification data. At step 3103, based on the combined identification data and the specification data, failure of the one or more nautical electronic devices 107 may be determined. The message 1100 illustrated in FIG. 11 is an exemplary message containing a plurality of fields specifying the combined identification data and specification data.

To that end, the method 3100 may execute a first trigger and a second trigger. The first trigger operates constantly as a background process to receive one or more messages from the one or more nautical electronic devices 107. Each message from the one or more messages comprises an alarm state data. Further, the first trigger processes the message based on a comparison of a current alarm state to a previous alarm state using the alarm state data. Further, the second trigger operates at scheduled intervals of time to receive one or more messages from the one or more nautical electronic devices 107. The second trigger processes the message to check whether there is a change in the alarm state data between a last scheduled timestamp and a current scheduled timestamp.

At step 3105, based on the processing of the message by the first trigger and the second trigger, the message with information associated with failure of the nautical electronic device 107 may be transmitted to the remote diagnostic center 109. Thus, the method 3100 includes transmitting only relevant information to the remote diagnostic centre 109 only when the failure of the one or more nautical electronic devices 107 occur, which ensures effective utilization of the resources.

Example embodiments of the present disclosure may thus provide for remote monitoring of the one or more nautical devices at the vessel using the diagnostic apparatus-103. The diagnostic apparatus 103 is in communication with the one or more devices and further it is directly connected to the remote diagnostic centre via the first satellite communication link. The direct communication provides correct real-time information associated with failure of the one or more nautical devices at the vessel, which enables the remote diagnostic centre to effectively determine cause of the failures of the one or more devices and provide corresponding accurate troubleshooting instructions accordingly. Further, the direct communication eliminates possible points of failure which consequently reduces the time required for troubleshooting the failure of the one or more devices. Thus, the present disclosure leads to an improved method for remote monitoring of the one or more devices at the vessel.

Many modifications and other embodiments of the disclosures set forth herein will come to mind of one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions, tools, software, and services than those explicitly described above are also contemplated as may be set forth in some of the appended claims. Although specific terms are employed herein, they are used in a generic and descriptive sense only and not for purposes of limitation.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated" and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A diagnostic apparatus for diagnosing at least one nautical electronic device on a vessel, the diagnostic apparatus comprising:
   a memory configured to store instructions; and
   processing circuitry configured to execute the stored instructions to:
      receive at least one message from the at least one nautical electronic device,
      the at least one message including identification data for identifying the at least one nautical electronic device and alarm state data indicating a current alarm state of the at least one nautical electronic device;
      compare the current alarm state of the at least one nautical electronic device with a previous alarm state of the at least one nautical electronic device to detect a failure of the at least one nautical electronic device;
      transmit failure detection information to a remote diagnostic center, the failure detection information comprising information associated with the failure of the at least one nautical electronic device and the identification data of the at least one nautical electronic device; and
      compare a message type of the at least one message with a target message type, wherein
      when the message type of the at least one message matches with the target message type, the at least one message is parsed; and
      when the message type of the at least one message does not match with the target message type, the at least one message is ignored.

2. The diagnostic apparatus of claim 1, wherein the processing circuitry is further configured to:
   store the current alarm state and the previous alarm state for the at least one nautical electronic device in a database; and
   update the current alarm state and the previous alarm state in the database, each time the at least one messages associated with the at least one electronic device is received.

3. The diagnostic apparatus of claim 2, wherein the processing circuitry is further configured to:
   store a timestamp of change of alarm state and a timestamp of the last alarm state change in the database.

4. The diagnostic apparatus of claim 3, wherein the processing circuitry is further configured to transmit the failure detection information to the remote diagnostic center by using a first satellite communication link.

5. The diagnostic apparatus of claim 4, wherein the processing circuitry is further configured to transmit Internet-of-Thing (IoT) portal data to the IoT portal, wherein the IoT portal data comprises:
   device management data for managing connection between the at least one nautical electronic device and the diagnostic apparatus; and
   connectivity data for managing connection between the diagnostic apparatus and the first satellite communication link.

6. The diagnostic apparatus of claim 5, wherein the processing circuitry is further configured to transmit the IoT portal data to the IoT portal using a second satellite communication link being different from the first satellite communication link.

7. The diagnostic apparatus of claim 1, wherein the at least one message, comprising the identification data and the alarm state data, is based on National Marine Electronics Association (NMEA) 0183 message.

8. The diagnostic apparatus of claim 7, wherein the processing circuitry is further configured to:
   identify the NMEA 0183 message encapsulated in the at least one message, based on the parsing;
   compare the NMEA 0183 message against a predefined set of valid NMEA 0183 message types;
   continue to parse the NMEA 0183 message when the NMEA 0183 message belongs to the predefined set of valid NMEA 0183 message types; and
   stop parsing the NMEA 0183 message when the NMEA 0183 message type does not belong to the predefined set of valid NMEA 0183 message types.

9. The diagnostic apparatus of claim 1, wherein the message type comprises at least one of:

a UNICAST message type, wherein the UNICAST message type is associated with a one-to-one transmission from the at least one nautical electronic device to the diagnostic apparatus, and a MULTICAST message type, wherein the MULTICAST message type is associated with a group communication where data transmission is addressed to a group of nautical electronic devices simultaneously.

10. The diagnostic apparatus of claim 1, wherein to detect the failure of the at least one nautical electronic device, the processing circuitry is further configured to:

execute a first trigger process constantly as a background process to receive the at least one message from the at least one nautical electronic device, wherein the first trigger process is configured to compare the current alarm state of the at least one nautical electronic device to the previous alarm state of the at least one nautical electronic device using the alarm state data in the at least one message, and wherein the processing circuitry is further configured to:
transmit the failure detection information associated with the at least one nautical electronic device to the remote diagnostic center based on the comparison performed by the first trigger process.

11. The diagnostic apparatus of claim 1, wherein to detect the failure of the at least one nautical electronic device, the processing circuitry is further configured to:

execute a second trigger process at scheduled intervals to:
compare, at each scheduled interval, the current alarm state of the at least one nautical electronic device with the previous alarm state of the at least one nautical electronic device using the alarm state data in the at least one message, and wherein the processing circuitry is further configured to:
transmit the failure detection information associated with the at least one nautical electronic device to the remote diagnostic center based on the processing of the at least one message by the second trigger process.

12. A method comprising:

receiving at least one message from the at least one nautical one nautical electronic device, including identification data for identifying the at least one nautical electronic device and alarm state data indicating a current alarm state of the at least one nautical electronic device;

comparing the current alarm state of the at least one nautical electronic device with a previous alarm state of the at least one nautical electronic device to detect a failure of the at least one nautical electronic device;

transmitting failure detection information to a remote diagnostic center, the failure detection information comprising information associated with the failure of the at least one nautical electronic device and the identification data of the at least one nautical electronic device;

receiving, from the remote diagnostic center, troubleshooting instructions to troubleshoot the failure of the at least one nautical electronic device; and comparing a message type of the at least one message with a target message type, wherein
when the message type of the at least one message matches with the target message type, the at least one message is parsed; and
when the message type of the at least one message does not match with the target message type, the at least one message is ignored.

13. The method of claim 12, wherein the at least one message comprising the identification data and the alarm state data is based on National Marine Electronics Association (NMEA) 0183 message.

14. The method of claim 13, wherein the method further comprises:

identifying the NMEA 0183 message encapsulated in the at least one message, based on the parsing;

comparing the NMEA 0183 message against a predefined set of valid NMEA 0183 message types;

continuing to parse the NMEA 0183 message when the NMEA 0183 message belongs to the predefined set of valid NMEA 0183 message types; and stopping parsing the NMEA 0183 message when the NMEA 0183 message type does not belong to the predefined set of valid NMEA 0183 message types.

15. The method of claim 12, wherein the message type comprises at least one of:

a UNICAST message type, wherein the UNICAST message type is associated with a one-to-one transmission from the at least one nautical electronic device to a diagnostic apparatus, and a MULTICAST message type, wherein the MULTICAST message type is associated with a group communication where data transmission is addressed to a group of nautical electronic devices simultaneously.

16. The method of claim 12, wherein for detecting the failure of the at least one nautical electronic device, the method further comprises:

executing a first trigger process constantly as a background process to receive the at least one message from the at least one nautical electronic device, wherein the first trigger process compares the current alarm state of the at least one nautical electronic device to the previous alarm state of the at least one nautical electronic device using the alarm state data in the at least one message, and wherein the method further comprises:
transmitting the failure detection information associated with the at least one nautical electronic device to the remote diagnostic center based on the comparison performed by the first trigger process.

17. A diagnostic apparatus for diagnosing at least one nautical electronic device on a vessel, the diagnostic apparatus comprising:

a memory configured to store instructions; and
processing circuitry configured to execute the stored instructions to:

receive at least one message from the at least one nautical electronic device, the at least one message including identification data for identifying the at least one nautical electronic device and alarm state data indicating a current alarm state of the at least one nautical electronic device;

compare the current alarm state of the at least one nautical electronic device with a previous alarm state of the at least one nautical electronic device to detect a failure of the at least one nautical electronic device;

transmit failure detection information to a remote diagnostic center, the failure detection information comprising information associated with the failure of the at least one nautical electronic device and the identification data of the at least one nautical electronic device, and execute a second trigger process at scheduled intervals to:
compare, at each scheduled interval, the current alarm state of the at least one nautical electronic device with the previous alarm state of the at least one nautical electronic device using the alarm state data in the at least one message, and transmit the failure detection information associated with the at least one nautical electronic device to the remote diagnostic center based on the processing of the at least one message by the second trigger process.

* * * * *